US012335901B2

(12) United States Patent
Lee et al.

(10) Patent No.: US 12,335,901 B2
(45) Date of Patent: Jun. 17, 2025

(54) APPARATUS AND METHOD FOR PROVIDING LOW-LATENCY LOCATION INFORMATION SERVICE IN WIRELESS COMMUNICATION SYSTEM

(71) Applicant: Samsung Electronics Co., Ltd., Suwon-si (KR)

(72) Inventors: Jicheol Lee, Suwon-si (KR); Sangsoo Jeong, Suwon-si (KR); Sunghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 17/912,361

(22) PCT Filed: Mar. 17, 2021

(86) PCT No.: PCT/KR2021/003304
§ 371 (c)(1),
(2) Date: Sep. 16, 2022

(87) PCT Pub. No.: WO2021/187893
PCT Pub. Date: Mar. 23, 2021

(65) Prior Publication Data
US 2023/0148189 A1    May 11, 2023

(30) Foreign Application Priority Data

Mar. 19, 2020    (KR) .................. 10-2020-0033922

(51) Int. Cl.
*H04W 64/00* (2009.01)
*H04W 24/02* (2009.01)
*H04W 76/28* (2018.01)

(52) U.S. Cl.
CPC ........... *H04W 64/00* (2013.01); *H04W 24/02* (2013.01); *H04W 76/28* (2018.02)

(58) Field of Classification Search
CPC ....... H04W 64/00; H04W 4/029; H04W 4/20; H04W 76/28; H04W 24/02
See application file for complete search history.

(56) References Cited

U.S. PATENT DOCUMENTS

2005/0136942 A1    6/2005   Timiri et al.
2010/0041418 A1    2/2010   Edge et al.
(Continued)

FOREIGN PATENT DOCUMENTS

CN    104349390 A    *   2/2015
CN    104322120 B    *   1/2019    ........... G01S 5/0036

OTHER PUBLICATIONS

3GPP TS 23.273 V16.2.0, 3rd Generation Partnership Project; Technical Specification Group Services and System Aspects; 5G System (5GS) Location Services (LCS); Stage 2, (Release 16), Dec. 22, 2019.
SA2, Reply LS on DRX parameters negotiation, R2-1806648, 3GPP TSG RAN WG2#102, Busan, Korea, May 20, 2018.
Qualcomm Incorporated., Local NR positioning in NG-RAN, R3-193586, 3GPP TSG-RAN WG3 Meeting #105, jubljana, Slovenia, Aug. 16, 2019.
(Continued)

*Primary Examiner* — Dung Hong
(74) *Attorney, Agent, or Firm* — Jefferson IP Law, LLP

(57) ABSTRACT

The present disclosure relates to a $5^{th}$ generation (5G) or pre-5G communication system for supporting a data transmission rate higher than that of a post-$4^{th}$ generation (4G) communication system such as long term evolution (LTE). According to various embodiments of the present disclosure, provided is a method for operating an access and mobility function (AMF) in a wireless communication system, comprising the steps of: receiving, from user equipment (UE), a mobile originated location request message including first location quality of service (QoS) information; receiving, from a gateway mobile location center (GMLC) or a network exposure function (NEF), a mobile terminated location request message including second location QoS information; determining UE configuration update on the basis of the first location QoS information and the second location (Continued)

QoS information; transmitting a UE configuration update command message to the UE; and transmitting a radio access network (RAN) update message to a RAN related to the UE in response to the reception of a UE configuration update complete message.

20 Claims, 14 Drawing Sheets

(56) References Cited

U.S. PATENT DOCUMENTS

| | | |
|---|---|---|
| 2019/0373441 A1 | 12/2019 | Ryu et al. |
| 2020/0112868 A1* | 4/2020 | Shariat .................. H04W 48/17 |
| 2020/0145953 A1* | 5/2020 | Youn ..................... H04W 60/04 |
| 2020/0196101 A1* | 6/2020 | Edge ..................... H04W 12/06 |
| 2020/0196298 A1* | 6/2020 | Edge ..................... G01S 5/0054 |
| 2022/0191764 A1* | 6/2022 | Ni ........................ H04W 36/322 |

OTHER PUBLICATIONS

3GPP TS 23.502 V16.3.0, 3rd Generation Partnership Project; Technical Specification Group Services and System Aspects; Procedures for the 5G System (5GS); Stage 2, (Release 16), Dec. 22, 2019.

3GPP TS 22.261, 3rd Generation Partnership Project; Technical Specification Group Services and System Aspects; Service requirements for the 5G system; Stage 1, (Release 17), Dec. 27, 2019.

Extended European Search Report dated Aug. 14, 2023, issued in European Patent Application No. 21770873.4.

3GPP TS 23.273, Technical Specification Group Services and System Aspects, Dec. 12, 2019.

3GPP TS 23.502, Technical Specification Group Services and System Aspects, Dec. 12, 2019.

3GPP TS 23.501, Technical Specification Group Services and System Aspects, Dec. 12, 2019.

3GPP TS 22.261, Technical Specification Group Services and System Aspects, Dec. 12, 2019.

\* cited by examiner

APPARATUS AND METHOD FOR PROVIDING LOW-LATENCY LOCATION INFORMATION SERVICE IN WIRELESS COMMUNICATION SYSTEM

TECHNICAL FIELD

The disclosure relates to a wireless communication system and, more particularly, to a method and an apparatus for providing a low-latency location information service in a wireless communication.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system.

The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

DISCLOSURE OF INVENTION

Technical Problem

Based on the above-mentioned discussion, the disclosure provides a method and apparatus for providing a low-latency location information service in a wireless communication system.

Solution to Problem

According to various embodiments of the disclosure, an operation method of an access and mobility function (AMF) is provided. The method may include an operation of receiving, from a user equipment (UE), a UE-originated location information request (mobile originated location request) message including first location quality of service (QoS) information, an operation of receiving a UE-terminated location information request (mobile terminated location request) message including second location QoS information from a gateway mobile location center (GMLC) or a network exposure function (NEF), an operation of determining updating of a UE configuration (UE configuration update) based on the first location QoS information and second location QoS information, an operation of transmitting a UE configuration update command message to the UE, and an operation of transmitting, to a base station (radio access network (RAN)) related to the UE, a RAN update (update RAN) message, in response to reception of a UE configuration update complete message.

According to various embodiments of the disclosure, an apparatus of an access and mobility function (AMF) in a wireless communication system is provided. The apparatus includes a transceiver and at least one processor. The at least one processor is configured to receive, from a user equipment (UE), a UE-originated location information request (mobile originated location request) message including first location quality of service (QoS) information, to receive a UE-terminated location information request (mobile terminated location request) message including second location QoS information from a gateway mobile location center (GMLC) or a network exposure function (NEF), to determine updating of UE configuration based on the first location QoS information and the second location QoS information, to transmit a UE configuration update command message to the UE, and to transmit, to a base station (radio access network (RAN)) related to the UE, a RAN update (update RAN) message in response to reception of a UE configuration update complete message.

Advantageous Effects of Invention

A method and apparatus according to various embodiments of the disclosure may provide a method and apparatus for providing a low-latency location information service in a wireless communication system.

Advantageous effects obtainable from the disclosure may not be limited to the above mentioned effects, and other effects which are not mentioned may be clearly understood, through the following descriptions, by those skilled in the art to which the disclosure pertains.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

In the following description, terms referring to signals, terms referring to channels, terms referring to control information, terms referring to network entities, terms referring to device elements, and the like are illustratively used for the sake of convenience. Therefore, the disclosure is not limited by the terms as used below, and other terms referring to subjects having equivalent technical meanings may be used.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

Further, in the following description of the disclosure, various embodiments will be described using terms and names employed in some communication standards (e.g., 3rd generation partnership project (3GPP)) only for the sake of illustration. However, various embodiments of the disclosure may be easily applied to other communication systems through modifications.

Figure 1:
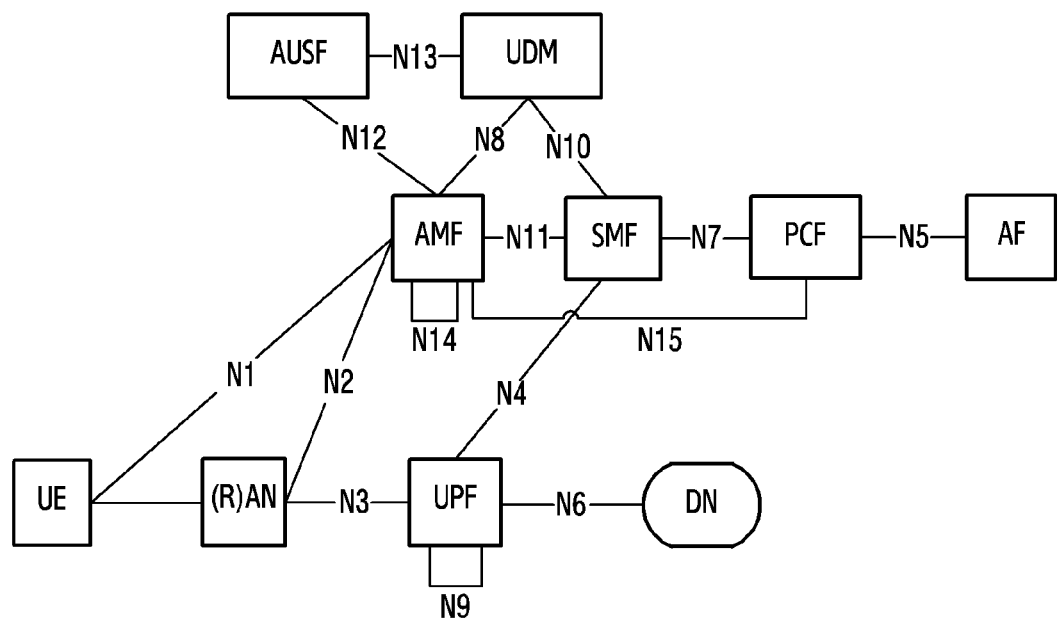
FIG. 1 is a diagram illustrating an example of a 5G system architecture using expression of a reference point in a wireless communication system.

FIG. 1 is a diagram illustrating an example of a 5G system architecture using expression of a reference point in a wireless communication system.

Referring to FIG. 1, the 5G system architecture may include various elements (i.e., network functions (NF)), and FIG. 1 illustrates some of the various elements such as an authentication server function (AUSF), a (core) access and mobility management function (AMF), a session management function (SMF), a policy control function (PCF), an application function (AF), a unified data management (UDM), a data network (DN), a user plane function (UPF), a (radio) access network ((R)AN), and a terminal, that is, a user equipment (UE).

Each NF may support a function as follows.

The AUSF stores data for authenticating a UE.

The AMF provides an access and mobility management function based on a UE unit, and a single AMF may be basically accessed by a single UE.

Specifically, the AMF may support functions such as signaling between CN nodes for mobility among 3GPP access networks, termination of a radio access network (RAN) CP interface (i.e., N2 interface), termination of a NAS signaling (N1), NAS signaling security (NAS ciphering and integrity protection), AS security control, registration management (registration area management), connection management, an idle mode UE reachability (including controlling and performing of paging retransmission), mobility management control (subscription and policy), supporting an intra-system mobility and inter-system mobility, supporting network slicing, selecting an SMF, lawful intercept (with respect to an AMF event and an interface to an L1 system), providing delivery of a session management (SM) message between a UE and an SMF, a transparent proxy for routing an SM message, access authentication, access authorization including checking of the right of roaming, providing delivery of an SMS message between a UE and an SMSF, a security anchor function (SAF), and/or security context management (SCM), and the like.

Some or all of the functions of an AMF may be supported in a single instance of a single AMF.

The DN may be, for example, an operator service, an Internet access or $3^{rd}$ parry service, or the like. The DN transmits a downlink protocol data unit (PDU) to a UPF, or receives, from the UPF, a PDU transmitted from a UE.

The PCF receives information associated with a packet flow from an application server, and provides a function of determining a policy associated with mobility management, session management, and the like. Particularly, the PCF supports functions such as supporting a unified policy framework to control network operations, providing policy rules so that a CP function(s) (e.g., an AMF, an SMF, and the like) implements the policy rules, implementing a front end for accessing related subscription information for determining a policy in a user data repository (UDR).

The SMF may provide a session management function, and in the case in which a UE has a plurality of sessions, the sessions may be managed by SMFs different from each other.

Specifically, the SMF supports functions such as session management (e.g., establishing, correcting, and releasing a session including maintaining a tunnel between a UPF and an AN node), allocating and managing a UE IP address (selectively including authentication), selecting and controlling a UP function, setting a traffic steering for routing traffic from a UPF to an appropriate destination, termination of an interface for policy control functions, performing the control part of a policy and quality of service (QoS), lawful intercept (with respect to an SM event and an interface to an L1 system), termination of an SM part of a NAS message, downlink data notification, an initiator of AN-specific SM information (transferring to an AN through N2 via an AMF), determining an SSC mode of a session, a roaming function, and the like.

Some or all of the functions of an SMF may be supported in a single instance of a single SMF.

The UDM stores user subscription data, policy data, and the like. The UDM includes two parts, that is, an application front end (FE) and a user data repository (UDR).

The FE includes a UDM FE that is in charge of processing location management, subscription management, a credential, and the like, and includes a PCF that is in charge of policy control. The UDR stores data required for functions provided by the UDM-FE and stores a policy profile required by the PCF. The data stored in the UDR includes user subscription data including a subscription identifier, a security credential, access and mobility related subscription data, and session-related subscription data, and may include policy data. The UDM-FE supports functions such as accessing subscription information stored in the UDR, authentication credential processing, user identification handling, access authentication, registration/mobility management, subscription management, SMS management, and the like.

The UPF transfers a downlink PDU received from a DN to a UE via a (R)AN, and transfer an uplink PDU received from a UE to a DN via a (R)AN.

Specifically, the UPF may support functions such as an anchor point for intra/inter RAT mobility, an external PDU session point of interconnection (interconnect) to a data network, packet routing and forwarding, a user plane part of implementation of policy rules and packet inspection, lawful intercept, reporting the amount of traffic used, an uplink classifier for supporting routing of a traffic flow to a data network, a branching point for supporting a multi-homed PDU session, QoS handling for a user plane (e.g., packet filtering, gating, implementing uplink/downlink rate), verifying uplink traffics (SDF mapping between a service data flow (SDF) and a QoS flow), marking a transport level packet in an uplink and downlink, buffering a downlink packet, triggering a downlink data notification, and the like. Some or all of the functions of a UPF may be supported in a single instance of a single UPF.

The AF interoperate with a 3GPP core network in order to provide a service (e.g., supporting functions such as application effect on traffic routing, accessing network capability exposure, interoperating with a policy framework for policy control, or the like).

The (R)AN is the generic term of a new radio access network that supports both an evolved E-UTRA (E-UTRA) that is an evolved version of the 4G radio access technology and a new radio (NR) (e.g., a gNB).

The gNB supports functions for radio resource management (i.e., radio bearer control, radio admission control, connection mobility control, dynamic allocation of resources (i.e., scheduling) to a UE in an uplink/downlink), Internet protocol (IP) header compression, encryption of a user data stream and integrity protection, selecting an AMF in the case of attachment of a UE if routing to the AMF is not determined based on information provided to a UE, user plane data routing to UPF(s), control plane information routing to an AMF, connection setup and release, scheduling and transmitting a paging message (generated from an AMF), scheduling and transmitting system broadcast information (generated from an AMF or operating and maintenance (O&M)), measuring for mobility and scheduling and configuring a measurement report, transport level packet marking in an uplink, session management, supporting network slicing, QoS flow management and mapping to a data radio bearer, supporting a UE in an inactive mode, distributing a NAS message, a NAS node selecting function, sharing a radio access network, dual connectivity, tight interworking between an NR and a E-UTRA, and the like.

The UE is a user device. The UE may also be referred to as a terminal, a mobile equipment (ME), a mobile station (MS), and the like. In addition, the UE may be a portable device such as a notebook, a portable phone, a personal digital assistant (PDA), a smartphone, a multimedia device, or the like, or may be a nonportable device such as a personal computer (PC), an in-vehicle device, or the like.

Figure 5:
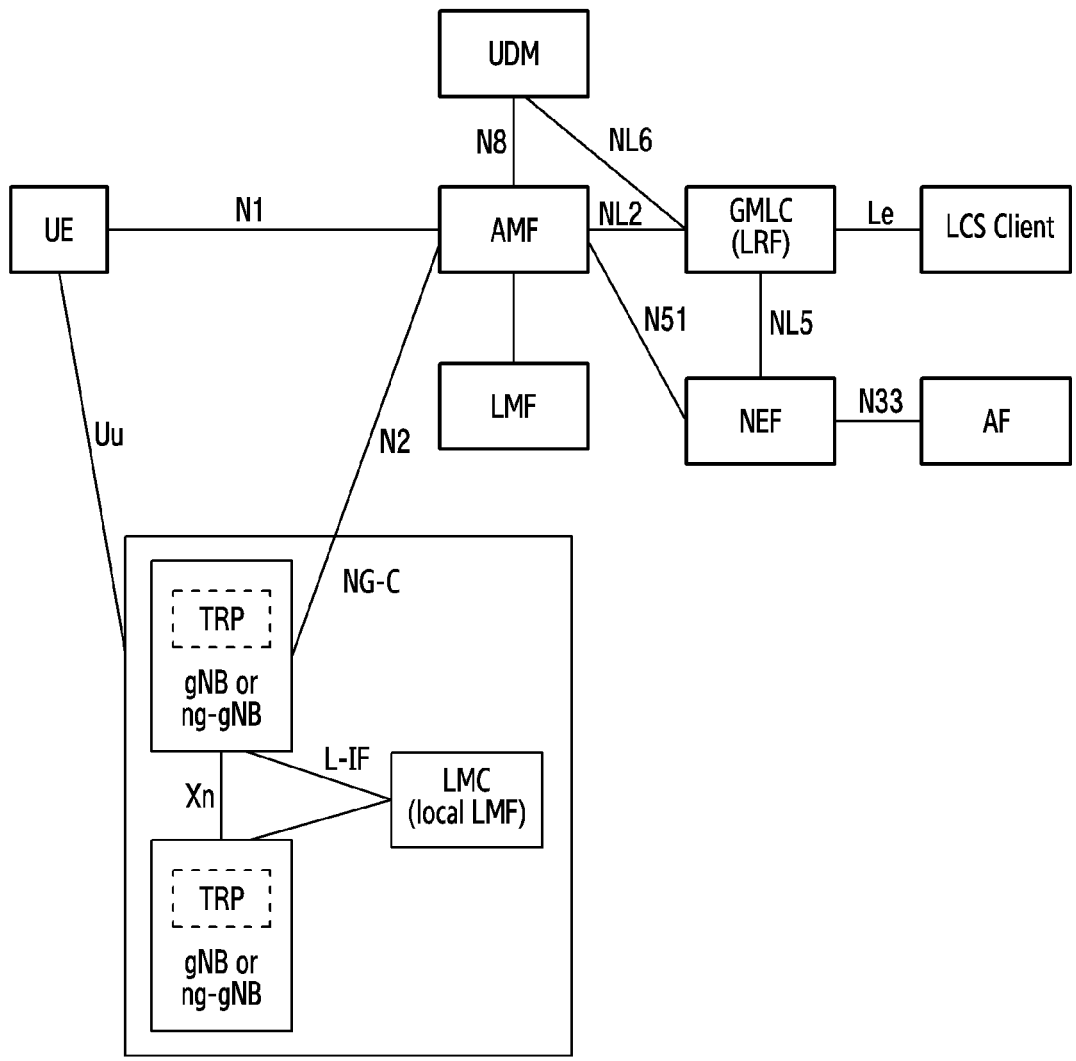
FIG. 5 is a diagram illustrating a system structure wherein an LMC and an LMF coexist in a wireless communication system according to various embodiments of the disclosure.

Although an unstructured data storage network function (UDSF), a structured data storage network function (SDSF), a network exposure function (NEF), and an NF repository function (NRF) are not illustrated for explicit description in FIG. 1, all NFs illustrated in FIG. 5 may interoperate with a UDSF, an NEF, and an NRF when needed.

The NEF may provide a unit for safely exposing, for example, services and capabilities for $3^{rd}$ party, internal exposure/re-exposure, an application function, edge computing provided by 3GPP network functions. The NEF receives information (information based on exposed capability (capabilities) of another network function(s)) from another network function(s). The NEF may store information received as structured data using an interface standardized based on a data storing network function. The stored information may be re-exposed to another network function(s) and an application function(s) by the NEF, and may be used for another purpose such as analysis or the like.

The NRF may support a service discovery function. An NF discovery request is received from an NF instance, and discovered NF instance information is provided to the NF instance. In addition, the NRF maintains available NF instances and services supported by them.

The SDSF is a selective function for supporting a function in which an NEF performs storing and retrieval of information as structured data.

The UDSF is a selective function for supporting a function in which an NF performs storing and retrieval of information as unstructured data.

For ease of description, although FIG. 1 illustrates a reference model in the case in which a UE accesses a single DN using a single PDU session, the disclosure is not limited thereto.

The UE may simultaneously access two data networks (i.e., a local data network and a central data network) using multiple PDU sessions. In this instance, two SMFs may be selected for different PDU sessions. Each SMF may have a capability of controlling both a local UPF and a central UPF in a PDU session.

In addition, the UE may simultaneously access two data networks (i.e., a local data network and a central data network) provided in a single PDU session.

In 3GPP system, a conceptual link that connects NFs in the 5G system is defined as a reference point. Examples of a reference point included in the 5G system architecture expressed in FIG. 1 are as follows.

Figure 2:
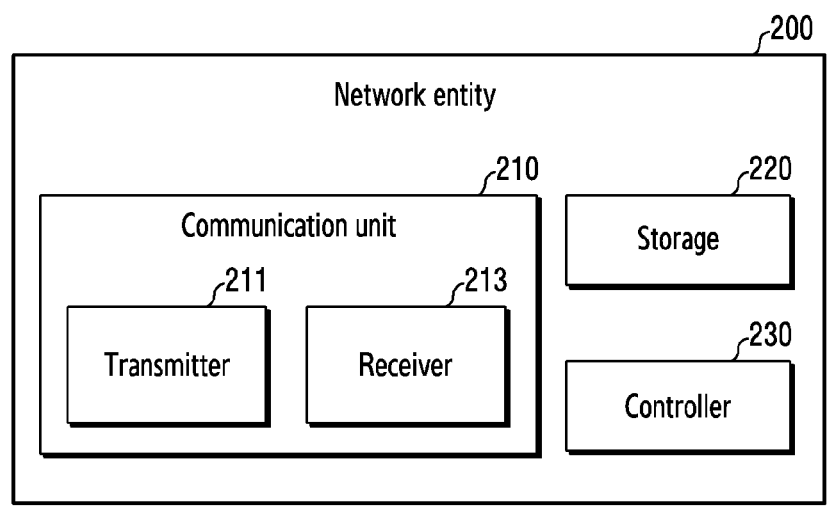
FIG. 2 is a diagram illustrating the configuration of a network entity in a wireless communication system according to various embodiments of the disclosure.

N1: a reference point between a UE and an AMF
N2: a reference point between an (R)AN and an AMF
N3: a reference point between an (R)AN and a UPF
N4: a reference point between an SMF and a UPF
N5: a reference point between a PCF and an AF
N6: a reference point between a UPF and a data network
N7: a reference point between an SMF and a PCF
N8: a reference point between a UDM and an AMF
N9: a reference point between two core UPFs
N10: a reference point between a UDM and an SMF
N11: a reference point between an AMF and an SMF
N12: a reference point between an AMF and an AUSF
N13: a reference point between a UDM and an authentication server function (AUSF)
N14: a reference point between two AMFs
N15: a reference point between a PCF and an AMF in the case of a non-roaming scenario, and a reference point between a PCF and an AMF in a visited network in the case of a roaming scenario FIG. 2 is a diagram illustrating the configuration of a network entity in a wireless communication system according to various embodiments.

A network entity of the disclosure is a concept including a network function according to the implementation of a system. The ending 'unit' or '-er' used hereinafter may refer to a unit by which at least one function or operation is performed, and may be embodied as hardware, software, or a combination of hardware and software.

The network entity according to various embodiments of the disclosure may include a communication unit 210, a storage 220, and a controller 230 that controls the overall operation of a network entity 200.

The communication unit 210 performs signal transmission and reception with other network entities. Accordingly, a part or all of the communication unit 210 may be referred to as a 'transmitter' 211, a 'receiver' 213, or a 'transceiver' 210.

The storage 220 stores data, such as a basic program, an application program, configuration information, and the like for operating the network entity 200. The storage 220 may be embodied as a volatile memory, a non-volatile memory, or a combination of a volatile memory and a non-volatile memory. The storage 220 provides data stored therein in response to a request from the controller 230.

The controller 230 controls the overall operation of the network entity 200. For example, the controller 230 performs signal transmission and reception via the communication unit 210. In addition, the controller 230 records data in the storage 220, and reads the recorded data. The controller 230 may perform the functions of a protocol stack that the communication standard requires. To this end, the controller 230 may include a circuit, an application-specific circuit, at least one processor, or micro-processor, or may be a part of a processor. In addition, a part of the communication unit 210 and the controller 330 may be referred to as a communication processor (CP). The controller 230 may control the network entity 200 to perform any one of the operations disclosed in various embodiments of the disclosure.

The communication unit 210 and the controller 230 may not necessarily need to be embodied as separate modules, and may be embodied as a single component in the form of a single chip or a software block. The communication unit 210, the storage 220, and the controller 230 may be electrically connected. In addition, the operations of the network entity 200 may be implemented by including the storage 220 that stores corresponding program code in the network entity 200.

The network entity 200 may include a network node, and may be one of a base station (RAN), an AMF, an SMF, a UPF, an NF, an NEF, an NRF, a CF, an NSSF, a UDM, an AF, an AUSF, an SCP, a UDSF, an NWDAF, a context storage, an OAM (operations, administration, and maintenance), an EMS, a configuration server, and an identifier (ID) management server.

The $3^{rd}$ generation partnership project (3GPP) that works on the standard of the cellular mobile communication names a new core network structure '5G core (5GC)' and proceeds with standardization in order to evolve the legacy 4G long term evolution (LTE) system to a 5G system.

Compared to an evolved packet core (EPC) that is a network core for the legacy 4G, the 5GC may support a differentiated function as follows.

First, the 5GC introduces a network slice function. Requirements for the 5G, the 5GC needs to support various types of UE and services. Examples of the 5G service may include an enhanced mobile broadband (eMBB), ultra reliable low latency communications (URLLC), and massive machine type communications (mMTC). Such UE/service may require different requirements from each core network. For example, in the case of an eMBB service, a high data transmission speed (data rate) is required, and in the case of a URLLC service, high reliability and low latency are required. Technology provided to satisfy such various service requirements is a network slice scheme. A network slice is a method of configuring multiple logical networks via virtualization of a single physical network, and each network slice instance (NSI) may have a characteristic different from one another. Therefore, each NSI may have a network function (NF) appropriate for its characteristic, and thus various service requirements may be satisfied. Various 5G services may be efficiently supported by allocating an NSI appropriate for the characteristic of a service that each UE requires.

Second, the 5GC may easily support a network virtualization paradigm via separating a mobility management function and a session management function. In the legacy 4G LTE, all UEs may receive a service over a network by exchanging signaling with single core equipment named 'mobility management entity' (MME) that is in charge of registration, authentication, mobility management and session management functions. However, in the 5G, the number of UEs is explosively increased and mobility and traffic/session characteristic that needs to be supported for each type of UE is subdivided. Accordingly, when single equipment such as an MME supports all functions, scalability that adds an entity for each function needed may deteriorate. Therefore, based on a structure that separates a mobility management function and a session management function in order to improve scalability from the perspective of a signaling load and the function/implementation complexity of core equipment that is in charge of a control plane, various functions are being developed.

Various embodiments of the disclosure provide a method and apparatus for providing a low-latency location information service in a wireless communication system. A high-precision and low-latency location information service that the 5G service requires may need a service response time less than or equal to 1 second. In the case of the discontinuous reception (DRX) cycle of a UE, 1.2 seconds is default for a voice over LTE (VoLTE) UE. Accordingly, if such DRX cycle is maintained, requirements of the high-precision and low-latency location information service may not be satisfied. In the case in which a request for the high-precision and low-latency location information service is received, various embodiments of the disclosure may provide a method and apparatus for providing a location information service that satisfies the requirements of a low-latency service response time.

According to various embodiments of the disclosure, in order to satisfy the requirements of the location information service, by shortening a period that periodically inspects a paging message in an idle state of a UE, a low-latency location information service may be provided even in the case in which the UE is in the idle state.

Figure 3:
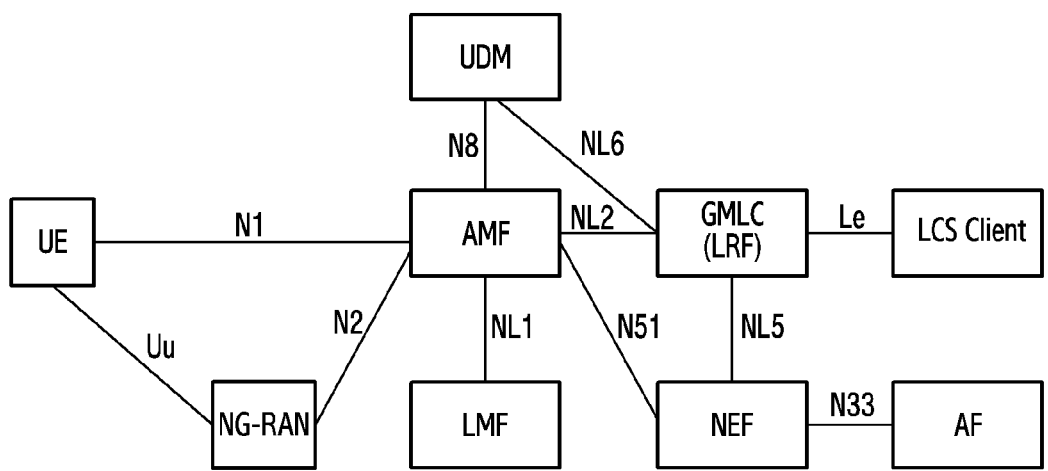
FIG. 3 is a diagram illustrating a network structure (including an LMF) that provides a core network location information service and an interface in a wireless communication system according to various embodiments of the disclosure.

FIG. 3 is a diagram illustrating a network structure (including an LMF) that provides a core network location information service and an interface in a wireless communication system according to various embodiments of the disclosure.

Specifically, FIG. 3 illustrates a network architecture that supports a location measurement service in a wireless communication system according to various embodiments of the disclosure. FIG. 3 illustrates the network structure (or the network architecture) of the 5G system and an interface according to various embodiments.

Referring to FIG. 3, the network structure of the 5G system may include a user equipment (UE), a radio access network ((R)AN), a user plane function (UPF), a data network (DN), an authentication server function (AUSF), an access and mobility management function (AMF), a session management function (SMF), a network slice selection function (NSSF), a network exposure function (NEF), a network repository function (NRF), a policy control function (PCF), a unified data management (UDM), an application function (AF), or the like.

According to various embodiments of the disclosure, the UE may be a terminal. The AMF is a network function that manages the mobility of a UE. The SMF is a network function that manages a packet data network connection provided to a UE. The connection is referred to as a protocol data unit (PDU) session. The PCF is a network function that applies the service policy and the charging policy of a mobile communication operator for a UE, and a policy associated with a PDU session. The unified data management (UDM) is a network function that stores and manages information associated with a subscriber. The NEF is capable of accessing information that manages a UE in the 5G network, and may be connected to 5G core network functions (NF) so as to transfer information associated with a UE to corresponding NFs and to report information associated with the UE to the outside, such as subscribing a mobility management event of the corresponding UE, subscribing a session management event of the corresponding UE, requesting for session-related information, configuring charging information of the corresponding UE, requesting for changing a PDU session policy for the corresponding UE, and the like. The 5G-radio access network (5G-RAN) is a base station that provides a radio communication function to a UE. In FIG. 3, it is illustrated as a (R)AN. The user plane function (UPF) may act as a gateway that transfers a packet transmitted or received. The UPF is connected to a data network (DN), and may perform a function of transferring a data packet produced from the 5G system to an external data network. The UPF may be connected to, for example, a data network connected to the Internet, and may perform routing a data packet transmitted from a UE to the Internet.

The 5G system may provide a high-precision and low-latency location information service.

Referring to FIG. 3, a location management function (LMF) may be a network function that is in charge of generally managing resources needed for providing the location information of a UE registered in the 5G system. The LMF calculates the location information of a UE or finally identifies the location of the UE, and reports the same to a global mobile location center (GMLC).

The LMF may receive a location information request associated with an objective UE from the AMF via an Nlmf interface. The LMF may exchange location information needed for a UE-based positioning method or a UE-assisted positioning method, and such protocol is referred to as an LTE positioning protocol.

According to various embodiments of the disclosure, the protocol named 'LPP' is a protocol used between a UE and a location information positioning server (an LMF or an LMC in various embodiments of the disclosure), for the UE-based positioning method or the UE-assisted positioning method. The LPP protocol is a protocol that is not necessarily limited to the 4G LTE, and may be used for 5G new radio (NR).

The LMF may determine a positioning result on geographical co-ordinates described in the technical document TS 23.032 that is the 3GPP standard. The positioning result determined by the LMF may include the speed of a UE. In addition, the LMF may perform the following functions.

(1) provide a location information service in response to a UE location information request from a serving AMF in association with an objective UE.

(2) provide a location information service in response to a request associated with an objective UE from a serving AMF that is triggered based on a UE location or periodically.

(3) determine a positioning scheme based on whether the functions of a UE and an operator network are supportable (capability), a QoS, and the type of LCS client.

(4) report, to a GMLC, UE positioning information associated with an objective UE that is triggered based on a UE location or periodically.

(5) cancel a UE positioning information report associated with an objective UE that is triggered based on a UE location or periodically.

(6) the LMF provides auxiliary data for providing location information broadcasted to a UE via an NG-RAN.

In the embodiment of FIG. 3, the gateway mobile location centre (GMLC) may provide a function needed for providing a location information service (location service). One or more GMLCs may be present in a single operator. A single GMLC is a first node that an external LCS client accesses when the external LCS client accesses an operator network. An AF and an NF in the 5G core (5GC) network that accesses the GMLC may directly access the GMLC, or may access the GMLC via an NEF. The GMLC may request routing information and the personal information of an objective UE from an UDM via a Nudm interface. After identifying the authorities of the AF and the external LCS client, and verifying the personal information of an objective UE, the GMLC may forward a location information request to the serving AMF via a Namf interface. In the case in which the UE performs roaming, the GMLC may forward a location information request to a PLMN of another operator network. Before transmitting a positioning result associated with the objective UE, the personal information configuration of the UE needs to be identified, and the personal information configuration always needs to be identified in a home operator network of the UE. A visited GMLC (VGLMC) is a GMLC that is present in a serving operator network of an objective UE.

A home GMLC (HGLMC) is a GMLC that is present in a home operator of an objective UE and performs a function of identifying the personal information of the objective UE.

Figure 4:
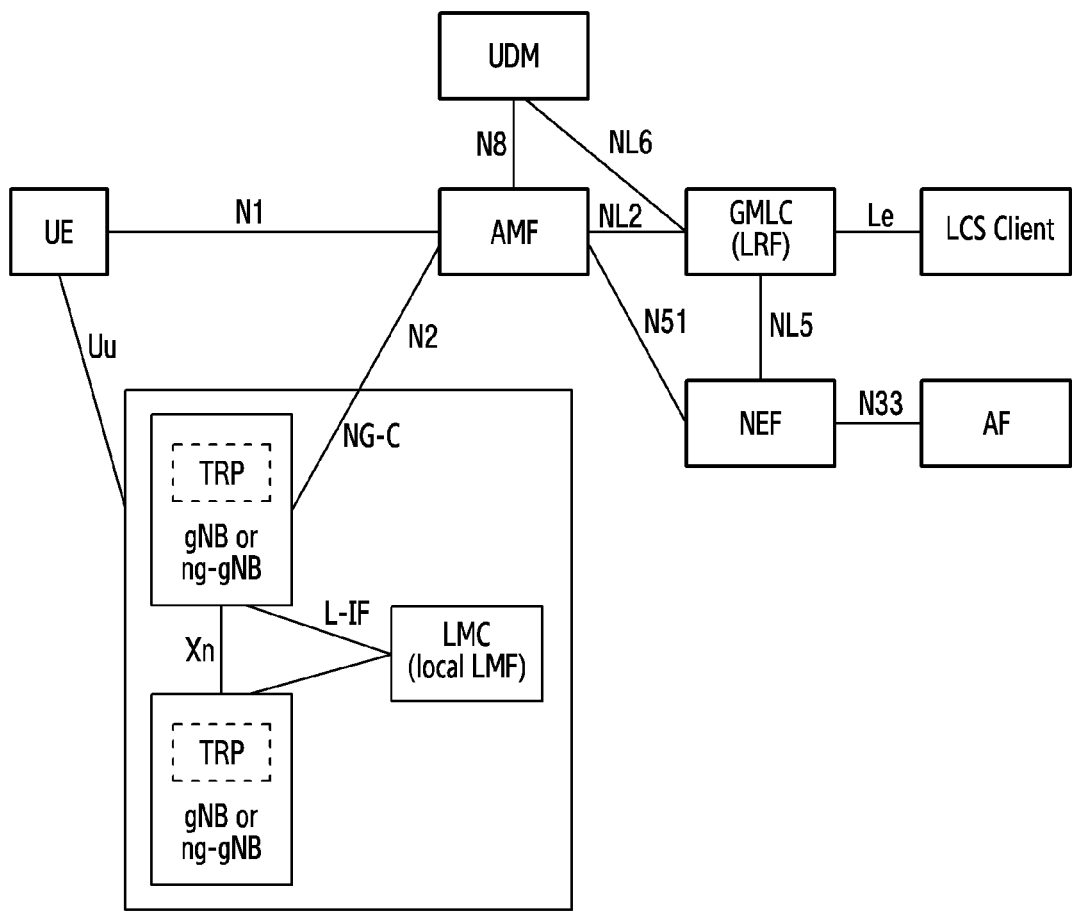
FIG. 4 is a diagram illustrating a network structure (including an LMC) that provides a RAN-based location information service and an interface in a wireless communication system according to various embodiments of the disclosure.

FIG. 4 is a diagram illustrating a network structure (including an LMC) that provides a RAN-based location information service and an interface in a wireless communication system according to various embodiments of the disclosure.

Particularly, FIG. 4 is a diagram illustrating a RAN-based location information service providing structure in a wireless communication system according to various embodiments of the disclosure. The embodiment of FIG. 4 shows a network configuration that is different from the embodiment of FIG. 3 that provides a location information service in the 5G system.

An LMF that performs a function of measuring location information in the embodiment of FIG. 3 is configured to be connected to an AMF in the 5G core network via an interface. However, in the embodiment of FIG. 4, a location management component (LMC) performs a function of measuring the location information of a UE, and the LMC is located in a RAN. The LMC of FIG. 4 performs the function of an LMF which has been described in the embodiment of FIG. 3. However, the LMC is present in an NG-RAN, and the LMC is connected to a gNB or ng-gNB via an L-IF. A UE, a GMLC, a UDM, an LCS client, an AF, and an NEF in the embodiment of FIG. 4 may perform the same functions which have been described in the embodiment of FIG. 3. In the case in which the GLMC receives a location information request, the GMLC transfers the location information request to the AMF, and the AMF transfers the location information request to an NG-RAN via an N2 reference point. A gNB (or ng-gNB) transfers the received location information request to the LMC via the L-IF.

The location management component (LMC) is a network function that is in charge of generally managing resources needed for providing the location information of a UE. The LMC may calculate the location information of a UE or may finally identify the location of the UE, and may report the same to a global mobile location center (GMLC).

The LMC may receive the location information request associated with an objective UE that is transferred to the NF-RAN from the AMF via the N2 reference point. In the case in which the LMC is present as a separate NF in the NG-RAN as illustrated in FIG. 4, the LMC may be connected to a gNB via the L-IF interface. The gNB transfers, to the LMC, the location information request received from the AMF via the N2 reference. The LMC receives the location information request forwarded from the AMF via the gNB. The function of the LMC may be implemented in the gNB or NG-gNB, and in this instance, the L-IF is present inside the gNB or NG-gNB and may not be exposed to the outside.

The LMC may exchange location information needed for a UE-based positioning method or a UE-assisted positioning method, and such protocol is referred to as an LTE positioning protocol. According to various embodiments of the disclosure, the protocol named 'LPP' is a protocol used between a UE and a location information positioning server (an LMF or an LMC in various embodiments of the disclosure) for the UE-based positioning method or UE assisted positioning method. The LPP protocol is a protocol that is not necessarily limited to the 4G LTE, and may be used for the 5G NR. The LMF determines a positioning result on geographical co-ordinates described in TS 23.032 that is the 3GPP technical document. The positioning result determined by the LMC may include the speed of a UE.

In addition, the LMC may perform the following functions.

(1) receive a location information service in response to a UE location information request from a serving AMF associated with an objective UE. The location information request may be received from a gNB via an L-IF interface.

(2) receive a location information request associated with an objective UE from a serving AMF that is triggered based on a UE location or periodically. The location information request may be received from gNB via an L-IF interface.

(3) determine a positioning scheme based on whether functions of a UE and an operator network are supportable (capability), a QoS, and an LCS client type.

(4) report, to a GMLC, UE positioning information associated with an objective UE that is triggered based on a UE location or periodically (5) cancel a UE positioning information report associated with an objective UE that is triggered based on a UE location or periodically (6) the LMC provides auxiliary data for providing location information broadcasted to a UE via an NG-RAN.

FIG. 5 is a diagram illustrating a system structure wherein an LMC and an LMF coexist in a wireless communication system according to various embodiments of the disclosure.

Specifically, FIG. 5 is a diagram illustrating a 5G system structure showing a structure in which a location management component (LMC) and a location management function (LMF) are present in a single serving operator. The LMC performs a function of a local LMF.

The descriptions associated with individual network functions are identical to the functions that have been described with reference to FIG. 3 and FIG. 4. In the system structure of the embodiment of FIG. 5, an AMF may be aware of whether an LMC and an LMF are coexist. In addition, when receiving a location information request, the AMF may determine whether to use an LMC location information service or an LMF location information service in consideration of whether a protocol and function provided by a UE is provided, a precision level and positioning method provided by the LMC and the LMF, a location information request service quality included in a location information request message, a type of service and a service identifier, a location information service identifier, a location information response time, required precision of location information, and the like.

In the 5G service, there are requirements in associated with high-precision and low-latency positioning, as shown in Table 1 below.

Table 1 below lists requirements associated with high-precision and low-latency positioning.

TABLE 1

| Positioning service level | Absolute(A) or Relative(R) positioning | Accuracy (95% confidence level) | | Positioning service availability | Positioning service latency |
|---|---|---|---|---|---|
| | | Horizontal Accuracy | Vertical Accuracy (note 1) | | |
| 1 | A | 10 m | 3 m | 95% | 1 s |
| 2 | A | 3 m | 3 m | 99% | 1 s |
| 3 | A | 1 m | 2 m | 99% | 1 s |
| 4 | A | 1 m | 2 m | 99.9% | 15 ms |
| 5 | A | 0.3 m | 2 m | 99% | 1 s |
| 6 | A | 0.3 m | 2 m | 99.9% | 10 ms |
| 7 | R | 0.2 m | 0.2 m | 99% | 1 s |

Referring to Table 1, in the case of positioning service levels 1, 2, 3, 5, and 7, a positioning service latency is 1 second. That is, the positioning service levels 1, 2, 3, 5, and 7 may requires a response time with low-latency.

Figure 6A:
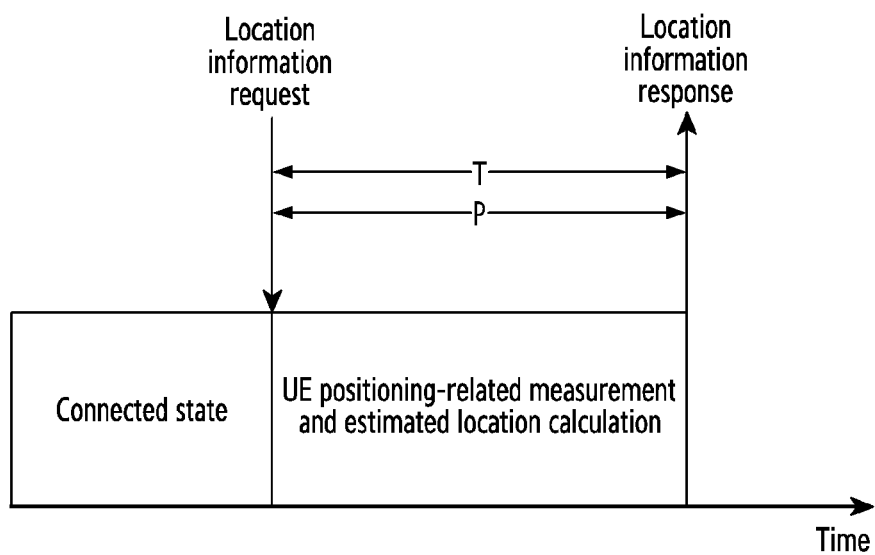
FIGS. 6A and 6B are diagrams illustrating a response time in association with a location information service (positioning service) in the case in which a UE is in a connected state or the UE is in an idle state in a wireless communication system.
Figure 6B:
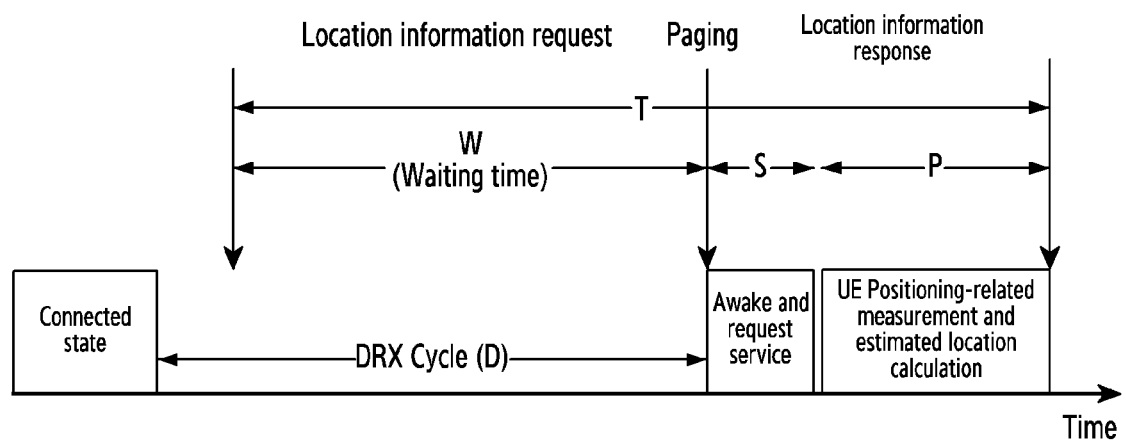

FIGS. 6A and 6B are diagrams illustrating a response time in association with a location information service (positioning service) in the case in which a UE is in a connected state or the UE is in an idle state in a wireless communication system.

The problem of the current technology is that a UE in the idle state is incapable of satisfying a service response time of approximately 1 second. In the case in which the UE is in the idle state, a provided service response time does not satisfy a service response time required based on a discontinuous reception (DRX) cycle.

For ease of description, FIG. 6A illustrates a response time associated with a location information service (positioning service) in the case in which a UE is in the connected state, and FIG. 6B illustrates a response time associated with a location information service (positioning service) in the case in which a UE is in the idle state.

Referring to FIG. 6A, T is the total time spent on a location information service, P is the time spent on a UE positioning procedure. The UE in the connected state performs UE positioning-related measurement and calculation of an estimated location immediately in response to a location information request, and thus T that is the total time spent on the location information service and P that is the time spent on the UE positioning procedure are the same.

FIG. 6B illustrates the time taken from the point in time of receiving a service location information service request and to the point in time of responding to the request for the location information service, in the case in which the UE is in the idle state. Referring to FIG. 6B, in the case in which the UE is in the idle state, the total time T spent on the total location information service may be calculated as shown in Equation 1 below.

$$T=W+S+P \qquad \text{Equation 1}$$

In Equation 1, T is the total time spent on a location information service. W is the time spent on standing by, staying in the idle state, until the UE requests a service. S is the time spent on performing a service request procedure after the UE awakes upon receiving a paging message. P is the time spent on a UE positioning procedure, that is, the time spent on UE positioning-related measurement and calculation of an estimated location.

In the case in which the UE is in the connected state, the total time spent on a location information service is the same as the time spent on performing a UE positioning procedure. Equation 2 below expresses the total time T spent on a location information service in the case in which the UE is in the connected state.

$$T=P \qquad \text{Equation 2}$$

In Equation 2, T is the total time spent on a location information service. P is the time spent on a UE positioning procedure, that is, the time spent on UE positioning-related measurement and calculation of an estimated location.

For example, in the case in which the UE is in the connected state and the time P spent on performing the UE positioning procedure is 0.3 seconds, T=0.3, and a location information service may be provided within 1 second that is a required service response time.

In the case in which the UE is in the idle state, the time spent on performing a UE positioning procedure is P, the time spent on a service request procedure is S, the time spent while the UE stands by in the idle state is W, and a set DRX cycle is D, W may be greater than or equal to 0 and less than or equal to D. In the case in which the UE is in the idle state, the total time T spent on a location information service may be calculated as shown in Equation 3 below.

$$T=W+S+P \text{ where } 0<=W<=D \qquad \text{Equation 3}$$

In Equation 3, T is the total time spent on a location information service. W is the time spent while the UE stays in the idle state and stands by until requesting for a service. S is the time spent on performing a service request procedure after the UE awakes upon receiving a paging message. P is the time spent on a UE positioning procedure, that is, the time spent on UE positioning-related measurement and calculation of an estimated location.

D is a set DRX cycle. For example, in the case in which S=0.1 and P=0.3, the total time T spent on the location information service may be calculated as shown in Equation 4 below.

$$0.4<=T<=1.6 \qquad \text{Equation 4}$$

In Equation 4, T is the total time spent on a location information service.

If it is assumed that a required service response time is 1 second, and the time spent on arrival of a location information service request is uniform, the probability that the total time spent on the location information service be less than or equal to a service response time, that is, the probability that the condition of a required service response time be satisfied may be as given in Equation 5 below.

$$P(0.4<=T<=1.0)=0.5 \qquad \text{Equation 5}$$

In Equation 5, T is the total time spent on a location information service. P is the probability that the total time spent on the location information service be less than or equal to a required service response time, that is, the probability that a required service response time be satisfied.

Based on Equation 5, in the case in which the UE is in the idle state, if 100 location information services that require a service response time of 1 second are present, a response time for 50 requests will be 1 or more seconds and service requirements may not be satisfied.

Figure 7:
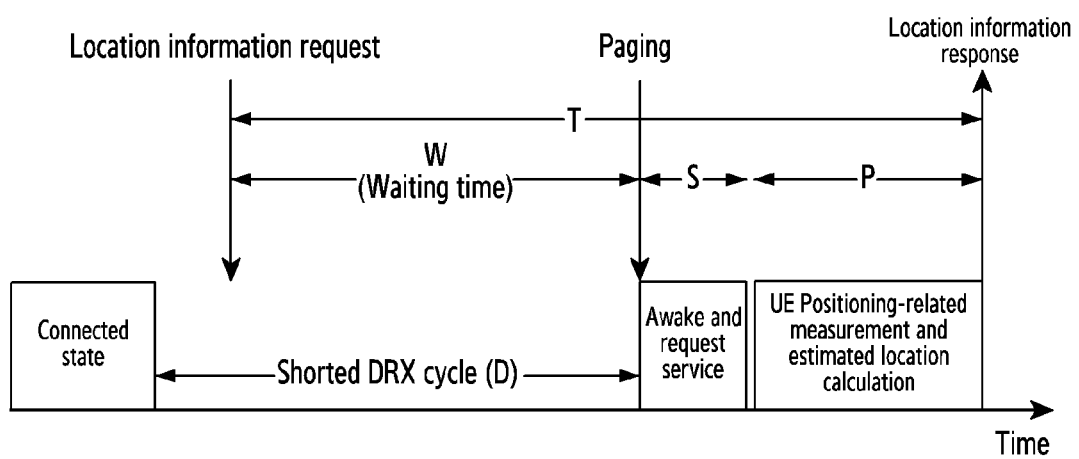
FIG. 7 is a diagram illustrating a response time in association with a location information service (positioning service) in the case in which a UE is in an idle state in a wireless communication system according to various embodiments of the disclosure.

Hereinafter, an embodiment of FIG. 7 provides a method of solving a problem in that the probability that a service requirement not be satisfied is high in the case in which a UE is in the idle state as described in the embodiment of FIG. 6B.

FIG. 7 is a diagram illustrating a response time in association with a location information service (positioning service) in the case in which a UE is in an idle state in a wireless communication system according to various embodiments of the disclosure.

Specifically, in order to solve the problem of the embodiment of FIG. 6B, the embodiment of FIG. 7 provides a scheme of re-configuration a DRX cycle in the state in which the UE is the idle state.

$$W+S+P<=R \qquad \text{Equation 6}$$

In Equation 6, W is the time spent while the UE stands by, staying in the idle state, until requesting for a service. S is the time spent on performing a service request procedure after the UE awakes upon receiving a paging message. P is the time spent on a UE positioning procedure, that is, the time spent on UE positioning-related measurement and calculation of an estimated location. R is a required response time.

In the case in which the time spent while the UE stands by in the idle state is W and a set DRX cycle is D, W is greater than 0 and less than D. W may have a value in the range of 0 to D, and thus in the case in which the value of W is set to D in order to satisfy the requirements of a service, this may be as given in Equation 7 below.

$$D+S+P \; R \qquad \text{Equation 7}$$

In Equation 7, D is a set DRX cycle, and S is the time spent on performing a service request procedure after the UE awakes upon receiving a paging message. P is the time spent on a UE positioning procedure, that is, the time spent on UE positioning-related measurement and calculation of an estimated location. R is a required response time.

If Equation 7 is transposed to the left-hand side of D, it is equal to Equation 8 as given below.

$$D<=R-(S+P) \qquad \text{Equation 8}$$

In Equation 8, D is a set DRX cycle, and S is the time spent on performing a service request procedure after the UE awakes upon receiving a paging message. P is the time spent on a UE positioning procedure, that is, the time spent on UE positioning-related measurement and calculation of an estimated location. R is a required response time.

In order to satisfy the requirements of a service, that is, a required service response time, a DRX cycle D may be set to a value of R−(S+P). For example, when it assumed that R=1.0 seconds, S=0.1 seconds, and P=0.3 seconds, if D is set to D=0.6 seconds, the requirements of the service may be satisfied.

Embodiment 1

Figure 8:
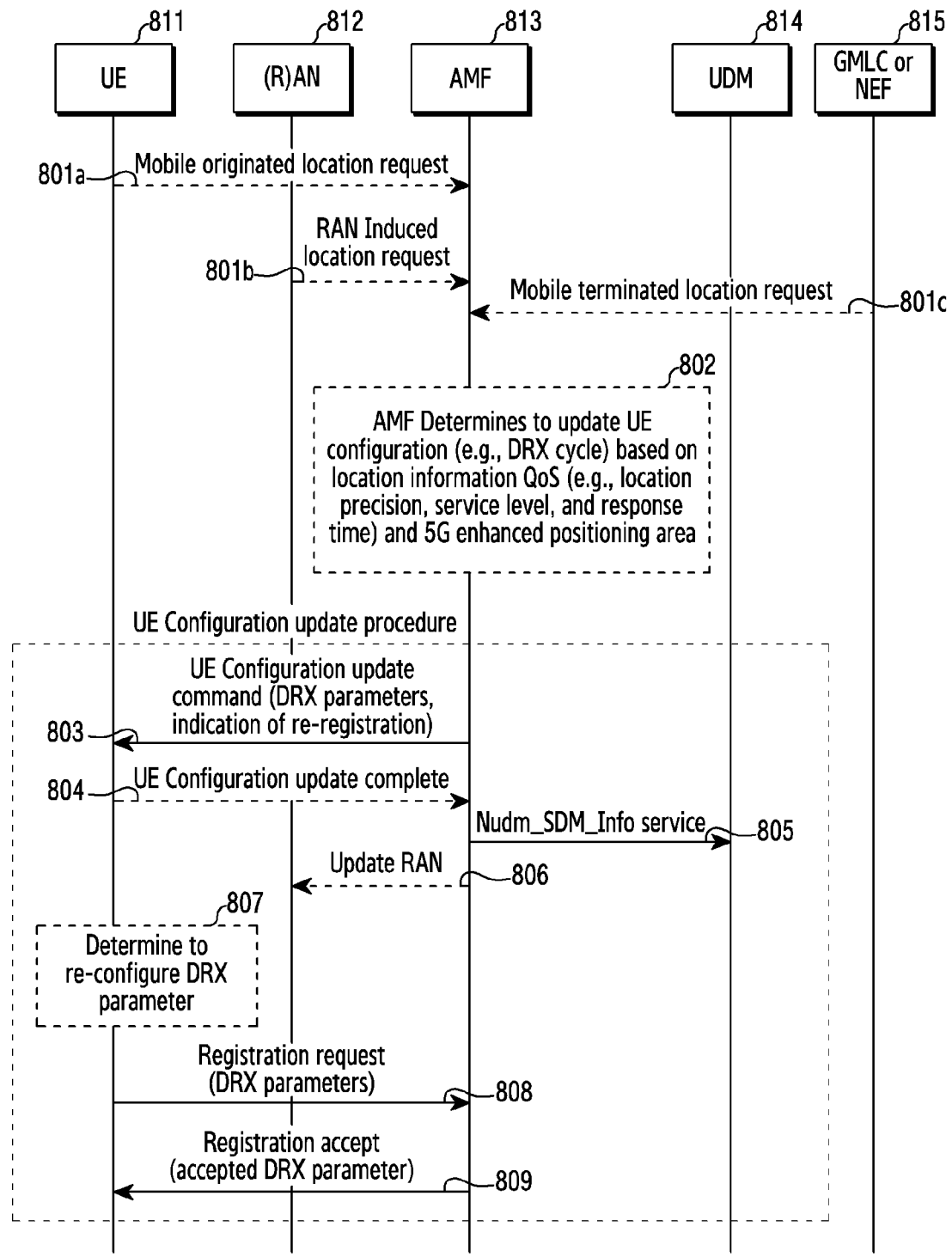
FIG. 8 is a diagram illustrating a process of re-configuration a DRX cycle of a UE in a wireless communication system according to various embodiments of the disclosure.

FIG. 8 is a diagram illustrating a process of re-configuration a DRX cycle of a UE in a wireless communication system according to various embodiments of the disclosure.

Specifically, in the embodiment of FIG. 8, there is provided a process of re-configuration a DRX cycle of an objective UE 811 in the case in which an AMF 813 receives a location information service request including the requirements of a service response time, or in the case in which the AMF 813 receives a location information service request from which the requirements of a service response time are inferable.

Operations 801a to 801c correspond to a process in which a location information service client transfers a location information service request. The request for a location information service may be initiated by a UE 811, a base station 812, or an external location service (LCS) client.

In operation 801a, the UE 811 transmits a UE-originated location information request (mobile originated location request) message to the AMF 813. In the case in which the UE 811 initiates a location information service, the UE 811 may transfer a location information request to the AMF 813 via an NAS message in operation 801a.

In operation 801b, the (R)AN 812 transmits a base station induced location information request (RAN induced location request) message to the AMF 813. In operation 801b, the base station 812 transfers a location information request to the AMF 813 via an N2 message.

In operation 801c, a GMLC or NEF 815 transmits a UE terminated location information request (a mobile terminated location request) message to the AMF 813. In operation 801c, an external LCS client of a system transfers a location information request to the AMF 813 via the GMLC or NEF 815. In the case in which the GMLC 815 receives the location information service request, the GMLC 815 transfers a UE context management (UECM) obtaining request to a UDM 814. The GMLC 815 receives, from the UDM 814, the address or the identifier of the AMF 813 that manages an objective UE of which the location is requested. The GMLC 815 transfers the location information request to the AMF 813.

The AMF 813 receives a location information request message from at least one of the UE 811, the base station 812, or the GMLC 815. In addition, the AMF 813 may receive a location information request message from the NEF 815. In addition, the AMF 813 may receive a location information subscription request from the UDM 814. A location provision request message or a subscription request message associated with a location provision service report received by the AMF 813 includes the information as follows.

(1) location information QoS (location QoS) information: information indicating the quality of a service for a location information request. The information may include location precision and service response time information. In addition, the type of location information service or the delimiter of a location information service may be included. The location information quality information may be a location service quality index corresponding to location precision and a service response time. The location service quality index may be autonomously stored in advance in the AMF 813. Alternatively, the index may be received from an external NF of the AMF 813, for example, a UDM or a PCF.

(2) location information service information: The type of location information service and the delimiter of a location information service may be set in advance in the AMF 813. The type of location information service and the delimiter of a location information service may be received from a device stored in a PCF or the UDM 814 that is an external NF of the AMF 813. The AMF 813 may extract location information service quality information mapped to the type of location information service and the delimiter of a location information service set in the AMF 813. The type of location information service may be used when the AMF 813 or a location management component (LMC) determines a positioning method to be used for determining the location of the UE 811.

In operation 802, the AMF 813 determines to update a UE configuration based on a location information QoS (location QoS), and a 5G enhanced positioning area. According to an embodiment, the location information QoS includes location precision, a service level, a response time, and the like, and the UE configuration includes a DRX cycle. In operation 802, the AMF 813 receives the location information request in operations 801a to 801c. The time P spent on performing a positioning procedure of the UE 811 and the time S spent while the UE performs a service request procedure are set in advance in the AMF 813. Based on a required response time for the location information service request and the values set in advance, the AMF 813 calculates a DRX cycle that needs to be set for the UE 811. Alternatively, the AMF 813 may obtain, from information mapped in advance, a service response time required by the type of location information service or a service identifier, and may calculate a DRX parameter (e.g., a DRX cycle) that needs to be set for the UE based on the service response time or may obtain the same from information set in advance.

Subsequently, in operations 803 to 809, a UE configuration update procedure is performed. When it is determined that a DRX parameter currently set is incapable of satisfying a service response time of a location information service request that may be continuously provided in the future, the AMF 813 determines to change the configuration of the DRX parameter. In the case in which the AMF 813 determines to change the DRX parameter, the AMF 813 initiates the UE configuration update procedure.

In operation 803, the AMF 813 transmits a UE configuration update command message to the UE 811. According to an embodiment, the UE configuration update command message includes DRX parameters, an indication of re-registration, and the like. In operation 803, the AMF 813 calculates a DRX cycle length required for providing a low-latency location information service, and determines a DRX parameter to be transferred to the UE 811. When the AMF 813 desires to update a parameter related to access ad mobility for the UE 811, the AMF 813 initiates the UE configuration update procedure. In order to change a UE specific DRX cycle for the UE 811, the AMF 813 performs the UE configuration update procedure so that the UE 811 re-performs a registration procedure in the connected state. When performing the UE configuration update procedure, the AMF 813 transmits, to the UE 811, an indicator indicating initiation of the registration procedure. The procedure may be transferred to the UE via 3GPP access or Non-3GPP access. The AMF 813 transfers, to the UE 811, the UE configuration update command including a DRX parameter (e.g., including a DRX cycle length) proposed by the AMF 813, and an indicator indicating initiation of the registration procedure. In the case of transferring the UE configuration update command message, if the AMF 813 transfers the UE configuration update command to the UE 811, the AMF 813, to the UE 811, one or more UE parameters, for example, a configuration change indicator, a globally unique temporary identifier (5G-GUTI), a tracking area identity (TAI) list, allowed network slice selection assistance information (NS-SAI), allowed NSSAI mapping information, a rejected S-NSSAI list, mobility restriction information, local access data network (LADN) information, mobile initiated connection only (MICO), access classification definition information defined by an operator, and the like, together with a DRX parameter.

In the case in which the DRX parameter (e.g., including a DRX cycle defined for each UE) proposed by the AMF 813 is transferred to the UE 811, the UE 811 may select a parameter that is acceptable by the UE 811 from among the "DRX parameters proposed by the AMF 813" received from the AMF 813, and may set the same as a DRX parameter requested by the UE 811.

The AMF 813 calculates a DRX cycle length required for providing a low-latency location information service, draws a DRX parameter to be transferred to the UE 811, and transmits, to the RAN 812, a request for configuring the DRX parameter for the UE 811 in operation 806.

In operation 804, the UE 811 transmits a UE configuration update complete message to the AMF 813. In the case in which the UE configuration update indicator that the UE 811 receives in operation 803 requests the UE to transmit a response message to the UE configuration update command, the UE 811 transfers the UE configuration update complete message to the AMF 813 in operation 804. In the case in which the UE 811 selects a DRX parameter that is acceptable by the UE 811 from among the DRX parameters transferred from the AMF 813, the UE 811 may transfer the UE configuration update complete message including the list of DRX parameters that the UE 811 allows.

In operation 805, the AMF 813 transmits a Nudm_SD-M_Info service message to the UDM 814. In operation 805, the AMF 813 stores a DRX parameter defined for each UE, which is to be set for the UE 811, in the UDM 814.

In operation 806, the AMF 813 transmits a RAN update (update RAN) message to the (R)AN 812. After performing operation 803, the AMF 813 may proceed with operation 806. Alternatively, the AMF 813 may not perform operations 803, 804, and 805, and may only proceed with operation 806. The AMF 813 sets a DRX parameter that is calculated and determined for the UE 811 in operation 802, which is to be proposed to the RAN 812, and may transfer the DRX parameter proposed by the AMF 813 to the RAN 812. In the case in which the RAN 812 receives a DRX parameter, the RAN 812 may change a configuration of the DRX parameter transferred to the UE 811. Particularly, the RAN 812 determines a DRX parameter to be set for the UE 811, and transfers an RRC-reconfiguration message to the UE 811 so as to set a DRX cycle defined for each UE.

In operation 807, the UE 811 decides to re-configure a DRX parameter. In the case in which parameters for which the UE 811 needs to change an RRC configuration in an AS layer are present among DRX parameters received via the UE reconfiguration update command (UE configuration update command) message, the UE 811 may transfer an indicator indicating change of a DRX configuration parameter to the AS layer in the UE 811. The UE 811 may store or change a DRX set value in the AS layer.

In operation 808, the UE 811 transmits a registration request message to the AMF 813. According to an embodiment, the registration request message includes DRX parameters. The UE 811 may finally determine a DRX parameter that the UE 811 is to use from among the DRX parameters received from the AMF 813. The UE 811 determines to update a registration procedure, and transmits the registration request message including the determined DRX parameter to the AMF 813. The AMF 813 receives a UE request DRX parameter included in the registration request message. The DRX parameter includes an idle state DRX cycle. The value of the idle state DRX cycle is a value equal to the value of D in above-described Equation 3, and may be a value for determining the maximum value of W of the location information service.

The DRX cycle in the idle state may correspond to both cases, that is, the case in which the UE 811 is in an CM-IDLE state and the case in which the UE 811 is in an RRC inactive state. After the UE 813 determines a DRX cycle value to be used by the UE 813 based on the DRX parameter that the AMF 813 proposes and is received via the UE configuration update command message, and determines to use the DRX cycle value, in the case in which the UE 811 transfers a registration request message including a UE requested DRX parameter to the AMF 813, the AMF 813 determines an allowed DRX parameter according to the UE requested DRX parameter transmitted by the UE 811. When determining the DRX parameter, the AMF 813 may adopt the value requested by the UE 811, as it is. Alternatively, the AMF 813 changes the DRX parameter value requested by the UE 811 according to an operator policy.

In the case in which the UE 811 is an RRC inactive with CM-CONNECTED, the UE 811 may apply a DRX cycle broadcasted by the RAN 812. Alternatively, the UE 811 may set a DRX cycle set by the RAN 812.

In operation 809, the AMF 813 transmits a registration accept message to the UE 811. According to an embodiment, the registration accept message includes an accepted DRX parameter. The AMF 813 transfers the adopted DRX parameter that the AMF 813 finally determines to the UE 811. After operation 809, the AMF 813 transmits a DRX parameter to the RAN 812 as shown in operation 806, and the RAN 812 may change a set value for the DRX parameter transferred to the UE 811 via broadcasting. Alternatively, the RAN 812 may change an RRC configuration associated with a DRX parameter defined for each UE, with respect to the corresponding UE 811.

Embodiment 2

Figure 9:
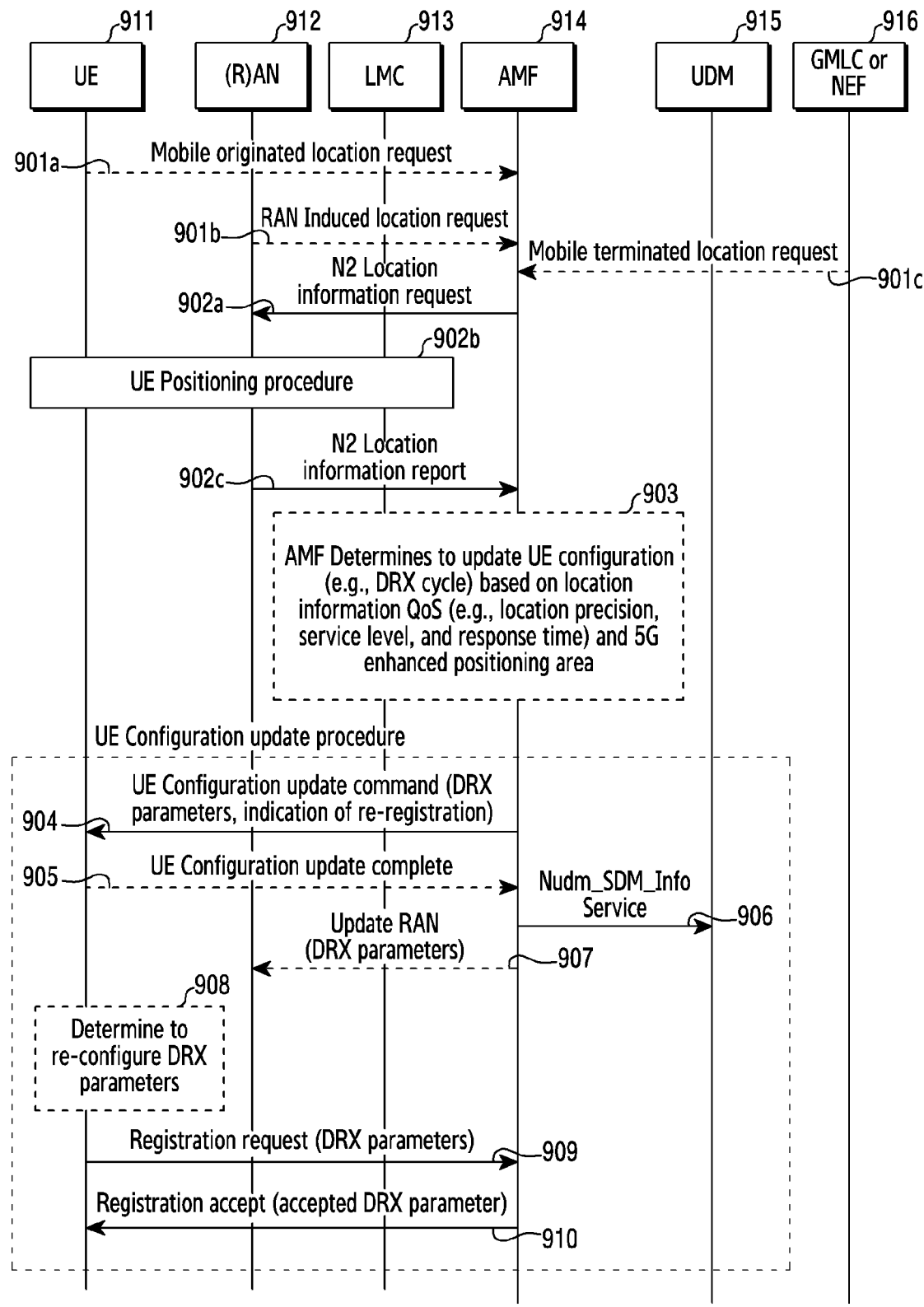
FIG. 9 is a diagram illustrating a process of performing a UE configuration update procedure after performing a UE positioning procedure in a wireless communication system according to various embodiments of the disclosure.

FIG. 9 is a diagram illustrating a process of performing a UE configuration update procedure after performing a UE positioning procedure in a wireless communication system according to various embodiments of the disclosure.

In operation 901a to 901c, an AMF 914 receives a location information service request as described in operations 801a to 801c of the embodiment of FIG. 8.

In operation 901a, a UE 911 transmits a UE-originated location information request (mobile originated location request) message to the AMF 914.

In operation 901b, an (R)AN 912 transmits a base station induced location information request (RAN induced location request) message to the AMF 914.

In operation 901c, a GMLC or NEF 916 transmits a UE terminated location information request (mobile terminated location request) message to the AMF 914.

In operations 902a to 902c, a LMC-based location information service request function is performed. Based on the location information request message received in operation 901a to 901c and existing information available for the AMF 914, the AMF 914 may determine information included in an N2 location control request.

The information available for the AMF 914 are as follows.

(1) location service quality information (location QoS): service quality index information corresponding to the precision of a location request and a service response time (2) location information service information: information associated with a service that requests a location information service, for example, the type of service, a service delimiter, or a service identifier.

(3) UE LCS capability: information associated with whether the location information service of the UE 911 is supported and protocol information for providing an LCS function of the UE 911 (an LPP over an RRC (LPP over RRC) or an LPP over a NAS (LPP over NAS), or a user plane protocol, for example, an open mobile alliance secure user plane location (OMA-SUPL)).

(4) a method of supporting UE location information service: an LMC utilization method, an LMF utilization method, and a location control report utilization method.

Based on information available for the AMF 914, information to be included in a message (e.g., a N2 location control request) related to location information to be requested from the RAN 912 is determined.

The information included in the N2 location control request are as follows.

(1) an indicator indicating whether to use a RAN-based positioning technology
(2) an LPP transport protocol (an LPP over an RRC (LPP over RRC) utilization indicator or a user plane utilization)
(3) an index indicating required location information service quality (e.g., positioning QoS index (location QoS index))
(4) an indicator indicating a direct positioning method (e.g., a positioning method index)
(5) the type of location information request (e.g., a one-time report, a periodic report, a triggered location report)
(6) an area of interest In operation 902a, the AMF 914 transmits an N2 location information request (N2 location request) message to the (R)AN 912.

The AMF 914 transfers the N2 location control request message to the RAN 912.

To measure the time spent on UE positioning, the AMF 914 records the times at which the identifier of a request of a message transferred to the AMF 914 or a transaction identifier, the identifier of the UE 911, and a message for requesting the RAN 912 node to measure location information are transmitted.

In order to measure, by the RAN 912 or the LMC 913, the time spent on UE positioning, the AMF 914 includes an indicator indicating measurement of a positioning measurement time required and report of the same (i.e., a UE positioning time required report indicator) in the N2 location control request and transmits the same. The RAN 912 or the LMC 913 that receives the UE positioning time required report indicator measures the time spent on UE positioning, includes the time actually spent on UE positioning in a location measurement response message or a location measurement report message and transfers the same.

In operation 902b, a UE positioning procedure is performed.

The RAN node 912 that receives the N2 location control request message determines, based on information included in the location control request message, the following items.

(1) information associated with whether the NG-RAN node (gNB or ng-gNB) 912 is to transfer a location information request to the LMC 913.

(2) in the case in which a plurality of LMCs are present, the LMC 913 that is to request location information associated with an objective UE is selected among the plurality of LMCs.

(3) the LMC 913 that supports a positioning method included in the N2 location control request message is selected among the LMCs.

In the case in which an LMC capable of performing a requested N2 location control request is present, the RAN 912 initiates a positioning request procedure of the LMC. Via a positioning request initiating message, a content included in the N2 location control request message received from the AMF is transferred. The content included in the control request message is as follows.

(1) location service quality-related information: precision, a service response time, or a location service quality index, which is information to which location information precision and location information service response time information are mapped.

(2) LPP transport protocol (an LPP over an RRC (LPP over RRC) utilization indicator or a user plane utilization)

(3) an indicator indicating a positioning method (e.g., a positioning method index)

(4) the type of location information request (e.g., a one-time report, a periodic report, a triggered location report)

The LMC 913 that receives a request for initiating a positioning procedure determines a positioning procedure and performs the positioning procedure based on the content included in the message received from the RAN node 912.

The UE 911 and the LMC 913 may perform the positioning procedure according to a positioning protocol (e.g., an LPP, or an LPP over an RRC (LPP over RRC)) or an LPP over a NAS (LPP over NAS). The positioning procedure may be performed as a procedure of determining a UE-based positioning method or as a procedure of a UE-assisted positioning method. According to the UE-based positioning method, the UE 911 directly calculates the location of a UE based on the location measurement information of the UE 911. In the case in which the UE 911 measures an estimated location, the UE 911 reports, to the LMC 913, the estimated location of the UE 911 that is calculated based on a location measurement protocol (e.g., an LPP).

According to the UE-assisted positioning method, the UE 911 reports, to the LMC 913 that is a location information server, measurement information needed for measuring the location of the UE 911, and the LMC 913 calculates the estimated location of the UE 911 based on the location measurement information received from the UE 911.

The LMC 913 that completes measuring the location of the objective UE 911 transfers a positioning report message to the NG-RAN 912. The positioning report message may include the identifier of a request so that a receiver determines a location information report associated with a report corresponding to the corresponding request.

The positioning report message of the UE 911 may include the following content of the location information report according to the location information request associate with the UE 911.

(1) the current location of the UE 911 in the 3GPP system (e.g., a cell identifier, a tracking area (TA) identifier, an LMC identifier, an area of interest or the identifier of an area of interest, or a presence reporting area or the identifier of a presence reporting area.)

(2) location information associated with the geographic area description (GAD) of the UE 911 The information associated with the GAD may be information expressing the location of the surface of the Earth ellipsoid as latitude and longitude, and may be information further expressing latitude and longitude, and an inaccurate circular shape or ellipsoid information, or polygonal shape information including a plurality of latitudes/longitudes. In the case in which high-precision location information is requested, each of the latitude information and longitude information may include location information provided in a high-precision form that uses 32 bits. In the case in which high-precision location information is not requested, the longitude and latitude information may include location information expressed in the form of 24 bits.

(3) the speed and direction of the movement of the UE 911: information associated with the speed and direction of the movement of the UE 911 that are calculated based on information associated with a movement made by the UE 911 during a predetermined period of time.

(4) information indicating that the movement of the UE 911 greater than or equal to a predetermine distance is detected: in the case in which the distance that the UE 911 moves is greater than a distance designated as a threshold value, it is determined that the UE 911 has moved. When it is determined that the UE 911 has moved, a report associated with UE movement detection is recorded, and an indicator indicating the UE movement detection and a travelled distance or path are included.

(5) designated location related event information: information indicating that entry into or leaving from a designated place is made, information indicating a movement is made within a designated place, or information indicating that a stationary state is continuously maintained within a designated place.

(6) whether a high-precision location information signal is detected: information indicating that the UE 911 detects a predetermined positioning technology (e.g., ultra wide band (UWB), a wireless fidelity (Wi-Fi), Bluetooth (BT), and the like) therearound.

In the case in which the LMC 913 receives, via the RAN 912, a UE positioning time required report indicator transferred from the AMF 914, the LMC 913 calculates the time spent on performing UE positioning. In order to measure the time spent on performing UE positioning, the LMC 913 may record the time at which a UE positioning protocol (e.g., an LPP) is initiated, and measures the time spent on performing UE positioning by calculating the difference between the initiation time and the time at which the UE positioning protocol is completely performed.

In operation 902c, the (R)AN 912 transmits an N2 location information report (N2 location report) message to the AMF 914. The AMF 914 receives the location information report from the base station 912. The location information report may include information associated with the location information request that the base station 912 receives in operation 902a. The AMF 914 identifies the information associated with the location information request via a request identifier included in the location information request. The AMF 914 determines a node to which a report message or a response to the location information request is to be transmitted based on the information identified from the request identifier.

In operation 902c, in order to calculate the time that the AMF 914 spends on location information measurement, the AMF 914 records a location information request time, a UE identifier, and a location information request identifier, and receives a response corresponding thereto. The AMF 914 calculates the difference between the current time and the time at which location information is requested, so as to calculate the time spent on performing UE positioning.

Alternatively, in order to calculate, by the AMF 914, the time spent on location information measurement, in the case in which a location information request includes a UE positioning time required report indicator, the AMF 914 may receive the time spent on performing UE positioning via a response message corresponding to the location information request or a UE location measurement report message. The AMF 914 may calculate the time spent on UE location measurement by adding the time spent on performing UE positioning in the LMC 913 or the RAN 912 and a backhaul network delay time.

A control plane backhaul network delay time may be the time spent on transferring a control message between the AMF 914 and the NG-RAN 912. Measuring the control plane backhaul network delay time may be calculated by measuring a round trip delay time of an NG-AP that is a control plane interface between the AMF 914 and the NG-RAN 912. Alternatively, that may be set in advance based on configuration information of a backhaul network installed between the AMF 914 and the NG-RAN 912.

In operation 903, the AMF 914 determines to update UE configuration based on a location information QoS (location QoS) and a 5G enhanced positioning area. According to an embodiment, the location information QoS includes location precision, a service level, a response time, and the like, and the UE configuration includes a DRX cycle.

As described above, Equation 7 is given as D+S+P<=R.

In operation 903, the AMF 914 calculates a D value based on a P value, an R value, and an S value in Equation 7. Specifically, the AMF 914 obtains the time (P in Equation 7) spent on performing UE location measurement that includes measurement or calculation performed in operations 902a to 902c. In addition, in operations 901a to 901c, the AMF 914 obtains a location information service response time (R in Equation 7) included in location information request service quality information included in the received location measurement request. The AMF 914 may obtain a service request performing time (S in Equation 7) that is set and stored in the AMF 914, that is, the time spent on performing a procedure in which the UE 911 is changed from a CM-IDLE state to a CM-CONNECTED state. Based on the P value, R value, and S value in Equation 7, the AMF 914 calculates a DRX cycle length value (D in Equation 7) that satisfies Equation 7.

Subsequently, in operations 904 to 910, a UE configuration update procedure is performed. The AMF 914 performs the UE configuration update procedure in operations 904 to 910, and performs a procedure of changing a DRX parameter calculated by the AMF 914. Alternatively, the AMF 914 performs operation 907 (the same procedure as operation 806 in the embodiment of FIG. 8), and configures a DRX parameter for the RAN 912.

In operation 904, the AMF 914 transmits a UE configuration update command message to the UE 911. According to an embodiment, the UE configuration update command message may include DRX parameters, an indication of re-registration, and the like. In operation 904, the AMF 914 performs the same procedure as operation 803 in the embodiment of FIG. 8.

In operation 905, the UE 911 transmits a UE configuration update complete message to the AMF 914. In operation 905, the AMF 914 performs the same procedure as operation 804 in the embodiment of FIG. 8.

In operation 906, the AMF 914 transmits a Nudm_SDM_Info service message to the UDM 914. In operation 906, the AMF 914 performs the same procedure as operation 805 in the embodiment of FIG. 8.

In operation 907, the AMF 914 transmits a RAN update message (update RAN) to the (R)AN 912. In operation 907, the AMF 914 performs the same procedure as operation 806 in the embodiment of FIG. 8.

In operation 908, the UE 911 decides to re-configure a DRX parameter. In operation 908, the AMF 914 performs the same procedure as operation 807 in the embodiment of FIG. 8.

In operation 909, the UE 911 transmits a registration request message to the AMF 914. According to an embodiment, the registration request message includes DRX parameters. In operation 909, the AMF 914 performs the same procedure as operation 808 in the embodiment of FIG. 8.

In operation 910, the AMF 914 transmits a registration accept message to the UE 911. According to an embodiment, the registration accept message includes an accepted DRX parameter. In operation 910, the AMF 914 performs the same procedure as operation 809 in the embodiment of FIG. 8.

Embodiment 3

Figure 10:
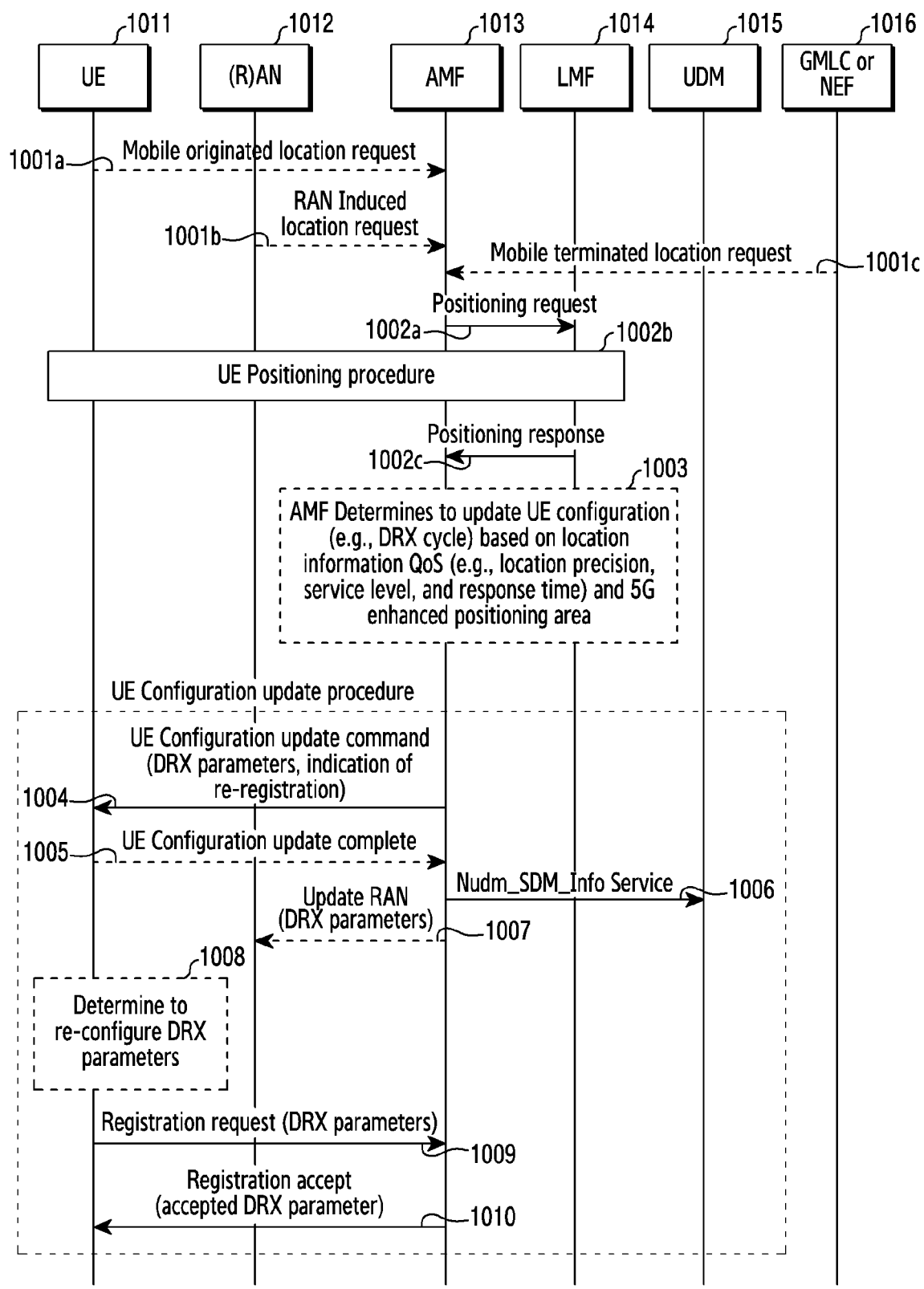
FIG. 10 is a diagram illustrating a process of performing a UE configuration update procedure after performing a location information service using an LMF in a location information service structure including an LMF in a wireless communication system according to various embodiments of the disclosure.

FIG. 10 is a diagram illustrating a process of performing a UE configuration update procedure after performing a location information service using an LMF in a location information service structure including an LMF in a wireless communication system according to various embodiments of the disclosure.

Operation 1001a to 1001c are the same as operations 801a to 801c in the embodiment of FIG. 8.

In operation 1001a, a UE 1011 transmits a UE-originated location information request (mobile originated location request) message to an AMF 1013.

In operation 1001b, a (R)AN 1012 transmits a base station induced location request (RAN induced location request) message to the AMF 1013.

In operation 1001c, a GMLC or NEF 1015 transmits a UE terminated location information request (mobile terminated location request) message to the AMF 1013.

Operations 1002a to 1002c correspond to a location information measurement procedure using the LMF 1014.

In operation 1002a, the AMF 1013 transmits a positioning request message to an LMF 1014. The AMF 1013 transmits the positioning request message to the LMF 1014.

In operation 1002b, a UE positioning procedure is performed. The LMF 1014 performs the UE positioning procedure together with the UE 1011 by utilizing a UE positioning protocol (e.g., an LPP over an NAS (LPP over NAS)).

In operation 1002c, the LMF 1014 transmits a positioning response message to the AMF 1013. When the LMF 1014 completes positioning associated with the location of the UE 1011, the LMF 1014 transmits the positioning response message to the AMF 1013.

To measure the time spent on positioning of the UE 1011, the AMF 1013 may record the times at which the identifier of a request of a message transferred to the AMF 1013 or a transaction identifier, the identifier of the UE 1011, and a message for requesting the LMF 1014 to measure location information are transmitted.

In order to measure, by the LMF 1014, the time spent on UE positioning, the AMF 1013 includes an indicator indicating measurement of a positioning measurement time required and report of the same (i.e., a UE positioning time required report indicator) in a positioning request (location determination request), and transmits the same. The RAN 1012 or the LMF 1014 that receives the UE positioning time required report indicator measures the time spent on performing UE positioning, and includes the time actually spent on UE positioning in a location measurement response message or a location measurement report message.

The content included in the positioning request message is as follows.
 (1) location service quality related information: precision, a service response time, or a location service quality index, which is information to which location information precision and location information service response time information are mapped.
 (2) an LPP transport protocol (an LPP over an RRC (LPP over RRC) utilization indicator or a user plane utilization)
 (3) an indicator indicating a positioning method (e.g., a positioning method index)
 (4) the type of location information request (e.g., a one-time report, a periodic report, a triggered location report)

The LMF 1014 that receives a request for initiating a positioning procedure determines, based on information included in the received message, a positioning procedure and performs the positioning procedure. The UE 1011 and the LMF 1014 performs the positioning procedure according to a positioning protocol (e.g., an LPP, or an LPP over an RRC (LPP over RRC)) or an LPP over a NAS (LPP over NAS). The positioning procedure may be performed as a procedure of determining a UE-based positioning method or as a procedure of a UE-assisted positioning method. According to the UE-based positioning method, the UE 1011 directly calculates the location of the UE 1011 via the location measurement information of the UE 1011. In the case in which the UE 1011 measures an estimated location, the UE 1011 reports, to the LMF 1014 that is a location information server, the estimated location of the UE 1011 that the UE 1011 calculates according to a location measurement protocol (e.g., an LPP).

According to the UE-assisted positioning method, the UE 1011 reports, to the LMF 1014 that is the location information server, measurement information needed for measuring the location of the UE 1011, and the LMF 1014 calculates the estimated location of the UE 1011 based on the location measurement information received from the UE 1011.

The LMF 1014 that completes measuring the location of the objective UE 1011 transfers a positioning report message to the LMF 1014. The positioning report message includes the identifier of a request so that a receiver determines a location information report associated with a report corresponding to the corresponding request.

The positioning report message of the UE 1011 may include the following content of the location information report according to the location information request associate with the UE 1011.
 (1) the current location of the UE 1011 in the 3GPP system (e.g., a cell identifier, a tracking area (TA) identifier, an LMC identifier, an area of interest or the identifier of an area of interest, a presence reporting area or the identifier of a presence reporting area.)
 (2) location information associated with the geographic area description (GAD) of the UE 1011 The information associated with the GAD is information expressing the location of the surface of the Earth ellipsoid as latitude and longitude, and may include information further expressing latitude and longitude, an inaccurate circular shape or ellipsoid information, or polygonal shape information including a plurality of latitudes/ longitudes. In the case in which high-precision location information is requested, each of the latitude information and longitude information includes location information provided in a high-precision form that uses 32 bits. In the case in which high-precision location information is not requested, the longitude and latitude information may include location information expressed in the form of 24 bits.
 (3) the speed and direction of the movement of the UE 1011: information associated with the speed and direction of the movement of the UE 1011 calculated based on information associated with a movement made by the UE 1011 during a predetermined period of time.
 (4) information indicating that the movement of the UE 1011 greater than or equal to a predetermine distance is detected: In the case in which the distance that the UE 1011 moves is greater than a distance designated as a threshold, it is determined that the UE 1011 has moved. When it is determined that the UE 1011 has moved, a report associated with UE movement detection is recorded, and an indicator indicating the UE movement detection and a travelled distance or path are included.
 (5) designated location related event information: information indicating that entry into or leaving from a designated place is made, information indicating a movement is made within a designated place, or information indicating that a stationary state is continuously maintained within a designated place.
 (6) whether a high-precision location information signal is detected: information indicating that the UE 1011 detects a predetermined positioning technology (e.g., ultra wide band (UWB), a wireless fidelity (Wi-Fi), Bluetooth (BT), and the like) therearound.

In the case in which the LMF 1014 receives a UE positioning time required report indicator transferred from the AMF 1013, the LMF 1014 calculates the time spent on performing UE positioning. In order to measure the time spent on performing UE positioning, the LMF 104 may record the time at which a UE positioning protocol (e.g., an LPP) is initiated, and may measure the time spent on performing UE positioning by calculating the difference between the initiation time and the time at which the UE positioning protocol is completely performed.

In operation 1002c, the LMF 1014 transmits a positioning response message to the AMF 1013. The AMF 1013 receives a location information report from the LMF 1014. The location information report may include information associated with the location information request that the LMF 1014 receives in operation 1002a. The AMF 1013 identifies the information associated with the location information request via a request identifier included in the location information request. The AMF 1013 determines a node (e.g., the UE 1011, the base station 1012, the GMLC or NEF 1016) to which a report message or a response to the location information request is to be transmitted based on the information identified from the request identifier.

In operation 1002c, in order to calculate the time that the AMF 1013 spends on location information measurement, the AMF 1013 records a location information request time, a UE identifier, and a location information request identifier, and receives a response corresponding thereto. The AMF 1013 calculates the difference between the current time and the time at which location information is requested, so as to calculate the time spent on performing UE positioning.

Alternatively, in order to calculate the time that the AMF 1013 spends on location information measurement, in the case in which the location information request includes a UE positioning time required report indicator, the AMF 1013 may receive the time spent on performing UE positioning via a response message corresponding to the location information request or a UE location measurement report message. The AMF 1013 may calculate the time spent on UE location measurement by adding the time spent on performing UE positioning in the LMF 1014 and an additional delay time between the AMF and the LMF.

In operation 1003, the AMF 1013 determines to update a UE configuration based on a location information QoS (location QoS) and a 5G enhanced positioning area. According to an embodiment, the location information QoS includes location precision, a service level, a response time, and the like, and the UE configuration includes a DRX cycle.

As described above, Equation 7 is given as D+S+P<=R.

In operation 1003, the AMF 914 calculates a D value based on a P value, an R value, and an S value in Equation 7. Specifically, the AMF 1013 obtains the time (P in Equation 7) spent on performing UE location measurement that includes measurement or calculation performed in operations 1002a to 1002c. In addition, in operations 1001a to 1001c, the AMF 1014 obtains a location information service response time (R in Equation 7) included in location information request service quality information included in the received location measurement request. The AMF 1014 may obtain a service request performing time (S in Equation 7) that is set and stored in the AMF 1014, that is, the time spent on performing a procedure in which the UE 1011 is changed from a CM-IDLE state to a CM-CONNECTED state. Based on the P value, R value, and S value in Equation 7, the AMF 1014 calculates a DRX cycle length value (D in Equation 7) that satisfies Equation 7.

Subsequently, in operations 1004 to 1010, a UE configuration update procedure is performed. The AMF 1013 performs the UE configuration update procedure in operations 1004 to 1010, and performs a procedure of changing a DRX parameter calculated by the AMF 1013. Alternatively, the AMF 1013 performs operation 1007 (the same procedure as operation 806 in the embodiment of FIG. 8), and configures a DRX parameter for the RAN 1012.

In operation 1004, the AMF 1013 transmits a UE configuration update command message to the UE 1011. According to an embodiment, the UE configuration update command message includes DRX parameters, an indication of re-registration, and the like. In operation 1004, the AMF 1013 performs the same procedure as operation 803 in the embodiment of FIG. 8.

In operation 1005, the UE 1011 transmits a UE configuration update complete message to the AMF 1013. In operation 1005, the AMF 1013 performs the same procedure as operation 804 in the embodiment of FIG. 8.

In operation 1006, the AMF 1013 transmits a Nudm_SDM_Info service message to the UDM 1014. In operation 1006, the AMF 1013 performs the same procedure as operation 805 in the embodiment of FIG. 8.

In operation 1007, the AMF 1013 transmits a RAN update (update RAN) message to the (R)AN 1012. In operation 1007, the AMF 1013 performs the same procedure as operation 806 in the embodiment of FIG. 8.

In operation 1008, the UE 1011 decides to re-configure a DRX parameter. In operation 1008, the AMF 1013 performs the same procedure as operation 807 in the embodiment of FIG. 8.

In operation 1009, the UE 1011 transmits a registration request message to the AMF 1013. According to an embodiment, the registration request message includes DRX parameters. In operation 1009, the AMF 1013 performs the same procedure as operation 808 in the embodiment of FIG. 8.

In operation 1010, the AMF 1013 transmits a registration accept message to the UE 1011. According to an embodiment, the registration accept message includes an accepted DRX parameter. In operation 1010, the AMF 1013 performs the same procedure as operation 809 in the embodiment of FIG. 8.

Embodiment 4

Figure 11:
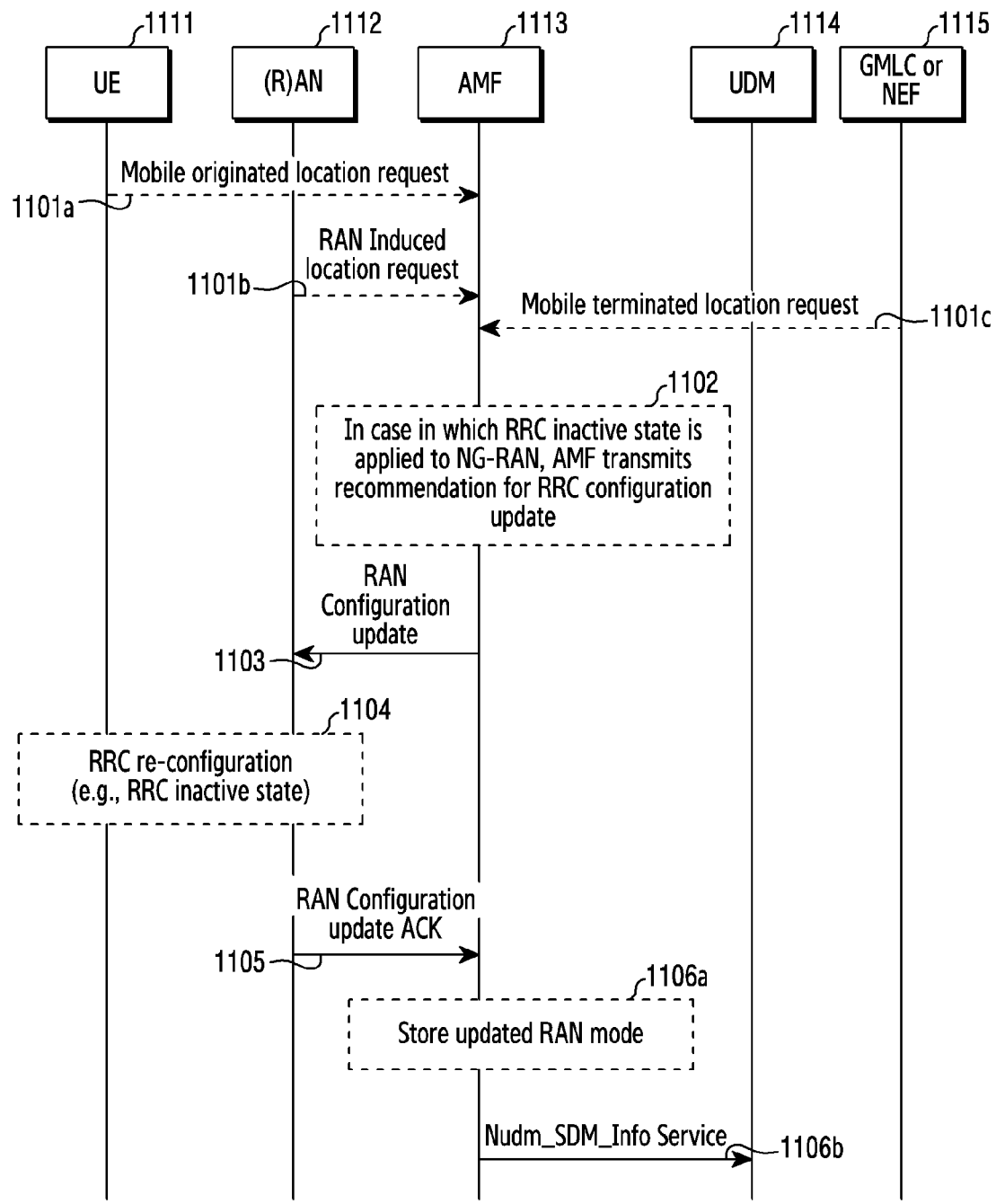
FIG. 11 is a diagram illustrating a process in which an AMF requests RRC re-configuration in the case in which an RRC inactive state is applied to a RAN in a wireless communication system according to various embodiments of the disclosure.

FIG. 11 is a diagram illustrating a process in which an AMF requests RRC re-configuration in the case in which an RRC inactive state is applied to a RAN in a wireless communication system according to various embodiments of the disclosure.

Operations 1101a to 1101c are the same as operations 801a to 801c in the embodiment of FIG. 8.

In operation 1101a, a UE 1111 transmits a UE-originated location information request (mobile originated location request) message to an AMF 1113.

In operation 1101b, a (R)AN 1112 transmits a base station induced location information request (RAN induced location request) message to the AMF 1113.

In operation 1101c, a GMLC or NEF 1115 transmits a UE terminated location information request (mobile terminated location request) message to the AMF 1113.

In operation 1102, in the case in which an RRC inactive state is applied to the NG-RAN 1112, the AMF 1113 transmits a recommendation for RRC configuration update.

As described above, Equation 7 is given as D+S+P<=R.

In operation 1102, the AMF 1113 calculates a D value based on a P value, an R value, and an S value in Equation 7. Specifically, the AMF 1113 obtains the time (P of Equation 7) spent on UE location measurement. In addition, in operations 1101a to 1101c, the AMF 1113 obtains a location information service response time (R in Equation 7) included in location information request service quality information included in the received location measurement request. The AMF 1113 obtain a service request performing time (S in Equation 7) that is set and stored in the AMF 1113, that is, the time spent on performing a state change procedure in which the UE 1111 is changed from an RRC inactive state to an RRC active state. Based on the P value, R value, and S value in Equation 7, the AMF 1113 calculates a DRX cycle length value (D in Equation 7) that satisfies Equation 7.

$$D+S'+P<=R \qquad \text{Equation 9}$$

D in Equation 9 is a set DRX cycle. S' is the time while the UE 1111 spends on a state change from an RRC inactive state to an RRC active state. P is the time spent on a UE positioning procedure, that is, the time spent on UE positioning related measurement and calculation of an expected location. R is a required response time.

In operation 1103, the AMF 1113 transmits a RAN configuration update (update RAN configuration) message to the (R)AN 1112. According to an embodiment, the RAN configuration update message includes an RRC configuration update indicator. The AMF 1113 transmits an N2 message that corrects a RAN configuration to the RAN 1112. The N2 message includes a DRX parameter of which a configuration needs to be changed in the RAN configuration information. The DRX parameter includes an idle mode DRX cycle.

In operation 1104, an RRC re-configuration is performed. For example, RRC reconfiguration applied in an RRC inactive state is performed. The RAN 1112 receives a message that changes a configuration of the RAN configuration. A message that changes a configuration of the RAN configuration may include a DRX parameter, and the DRX parameter may include an idle model DRX cycle. The RAN 1112 changes a configuration for the set value of an idle mode DRX cycle applied in the RRC inactive state. In order to change the configuration of the UE 1111, the RAN 1112 performs an RRC re-configuration procedure.

In operation 1105, the (R)AN 1112 transmits, to the AMF 1113, a RAN configuration update acknowledgement (update RAN configuration ACK) message. The RAN node 1112 that successfully performs the RRC re-configuration reports, to the AMF 1113, that a RAN configuration is successfully changed. The message reporting that a RAN configuration is changed may include re-set DRX parameters. The DRX parameter may include a newly set idle mode DRX parameter.

In operation 1106a, the AMF 113 stores an updated RAN mode (the update RAN mode). The AMF 1113 stores the reset DRX parameters. When DRX parameter configuration is successfully completed, the AMF 1113 stores the state associated with a low-latency response RRC mode together with the DRX parameter reset for the UE 1111. The stored DRX parameter and the low-latency response RRC mode state may be used by the AMF 1113 during a movement procedure. When a new AMF performs a registration procedure for the UE 1111, a DRX parameter included in the context of the UE that a previous AMF stores and a response RRC mode state are transmitted to the new AMF. Based on the context information stored in relation to the DRX parameter of the UE 1111, the response RRC mode state, and a location information request, the new AMF may determine whether to perform an RRC configuration update on a new RAN. In the case in which the new AMF determines an RRC configuration, a RAN configuration information update procedure may be performed according to procedures 3 to 5 in the embodiment.

In operation 1106b, the AMF 1113 transmits a Nudm_SDM_Info service message to the UDM 1114. The AMF 1113 may store, in the UDM 1114, the state related to processing of a location information request associated with the UE 1111, a successfully set DRX parameter, and the state associated with a low-latency response RRC mode.

Embodiment 5

Figure 12:
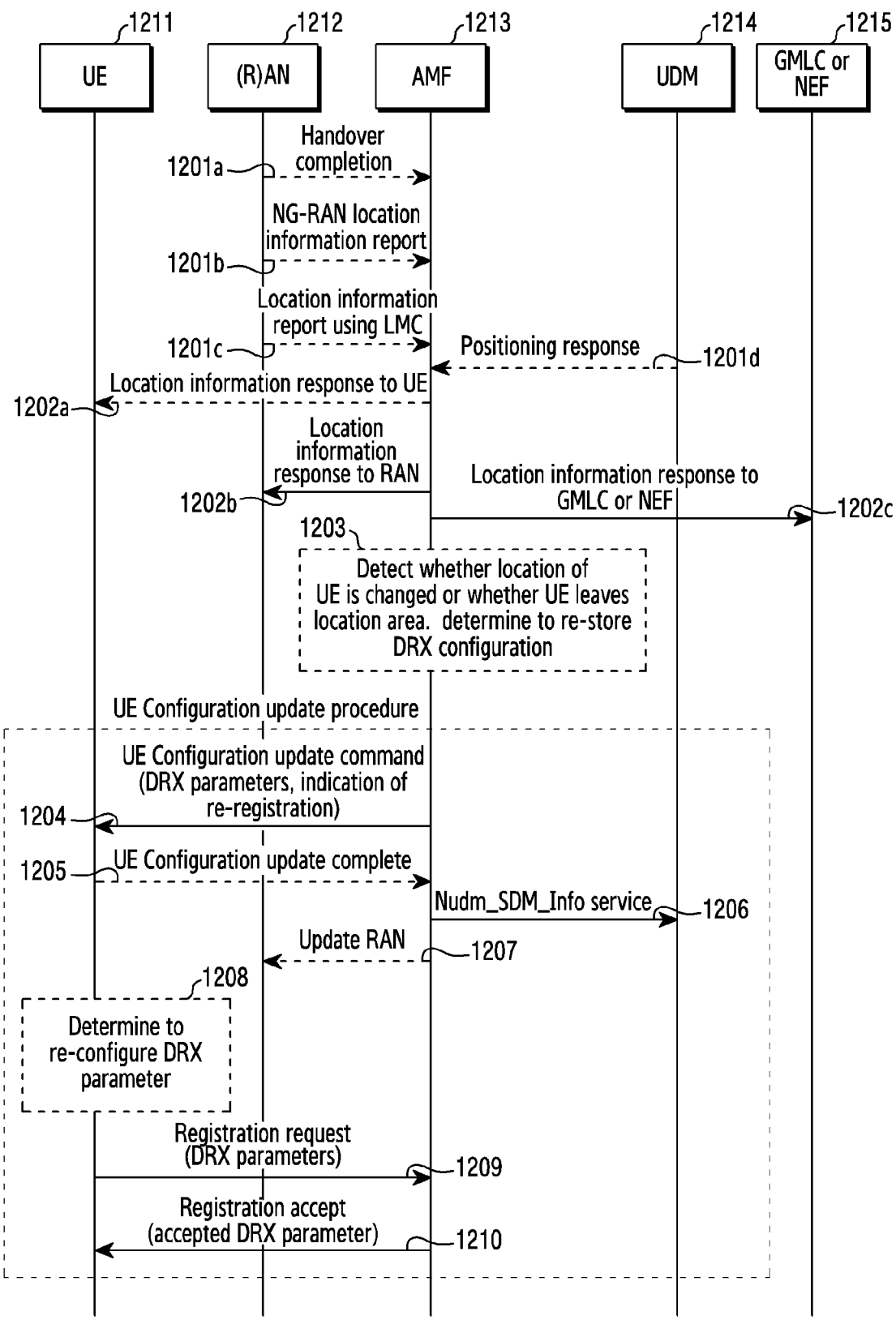
FIG. 12 is a diagram illustrating a process of restoring an existing DRX cycle to an original value after successfully completing a UE location information service in a wireless communication system according to various embodiments of the disclosure.

FIG. 12 is a diagram illustrating a process of restoring an existing DRX cycle to an original value after successfully completing a UE location information service in a wireless communication system according to various embodiments of the disclosure.

A DRX parameter restoration procedure may be performed even when a UE 1211 in the idle state (a CM-IDLE state or an RRC inactive) does not need to be promptly changed to a connected state (CM-CONNECTED or RRC connected) any longer due to the movement of the UE 1211. After performing a location information service or detecting a change of the location information of the UE 1211, an AMF 1213 performs a procedure of restoring a DRX cycle to the value of a previous DRX cycle that was used before the DRX parameter of the UE 1211 is corrected, that is, performs a UE configuration update procedure.

To implement the embodiment of FIG. 12, the AMF stores an existing DRX parameter in a UE context in operation 802 of the embodiment of FIG. 8. Alternatively, in operation 903 of the embodiment of FIG. 9 or operation 1003 of the embodiment of FIG. 10, or operation 1102 of the embodiment of FIG. 11, the AMF stores an existing DRX parameter in a UE context.

Operations 1201a to 1201d correspond to a triggering condition for performing operation 1203. An AMF 1213 detects a change of the location information of a UE 1211. Operations 1201a to 1201d corresponds to a procedure for triggering a procedure of a restoring DRX parameter configuration information in operation 1203, due to a change of the location of the UE.

In operation 1201a, a (R)AN 1212 transmits a handover completion message to the AMF 1213. In an N2/Xn handover procedure, the AMF 1213 detects a change of the location of the UE 1211.

In operation 1201b the (R)AN 1212 transmits an NG-RAN location information report (NG-RAN location report) message to the AMF 1213. Via NG-RAN location reporting, the AMF 1213 detects a change of the location of the UE 1211.

In operation 1201c, the (R)AN 1212 transmits a location information report using an LMC (location report using LMC) to the AMF 1213. After performing an LMC-based UE positioning procedure, the RAN 1212 or the LMC transfers the location information of the UE 1211 to the AMF 1213.

In operation 1201d, a UDM 1214 transmits a positioning response (location determination response) message to the AMF 1213. After performing the UE positioning procedure of an LMF, the LMF transfers the location information of the UE 1211 to the AMF 1213.

Operations 1202a to 1202c correspond to a triggering condition for performing operation 1203.

In operation 1202a, the AMF 1213 transmits a location information response (location response) message to the UE 1211.

In operation 1202b, the AMF 1213 transmits a location information response (location response) message to the (R)AN 1212.

In operation 1202c, the AMF 1213 transmits a location information response (location response) message to a GMLC or NEF 1215 or an AF.

In the case in which the AMF 1213 performs a UE location information obtaining procedure in response to a location information request such as operations 801a to 801c of the embodiment of FIG. 8, the AMF 1213 transfers UE location information to an entity that requests the UE location information, for example, the UE 1211, the base station 1212, the GMLC or the NEF 1215, or the AF.

In the case in which the AMF 1213 transmits a message that indicates completion of performing associated with the UE location information request in response to the request, in the case in which the AMF 1213 transmits a UE location information report message, or in the case in which the AMF 1213 determines that a quick location information service is not needed any longer, operation 1203 of the AMF 1213 is triggered.

In operation 1203, the AMF 1213 detects whether the location of the UE 1211 is changed or whether the UE 1211 leaves a location area (detect UE location is changed and UE moved out of location area), and determines to re-store a DRX configuration (decide to re-store the DRX configuration).

Due to the movement of the UE 1211 such as operations 1201a to 1201d, the AMF 1213 determines that the low-latency location information service is not needed in the area from which the UE 1211 leaves in operation 1203. Alternatively, due to completion of the location information service such as operations 1202*a* to 1202*c*, the AMF 1213 determines that the low-latency location information service is not needed any longer in operation 1203.

To perform the embodiment of FIG. 12, an AMF stores an existing DRX parameter in a UE context in operation 802 of the embodiment of FIG. 8. Alternatively, in operation 903 of the embodiment of FIG. 9 or operation 1003 of the embodiment of FIG. 10, or operation 1102 of the embodiment of FIG. 11, an AMF stores an existing DRX parameter in a UE context.

The AMF 1213 performs a UE configuration update procedure in operations 1204 to 1210 in order to restore a previous DRX parameter configuration that was stored in the UE context.

Alternatively, the AMF 1213 includes a DRX parameter in a message for changing a RAN configuration of operation 1207 and transmits the same to the RAN node 1212, in order to restore a previous DRX parameter configuration that was stored in the UE context.

Subsequently, in operations 1204 to 1210, a UE configuration update procedure is performed. In operations 1204 to 1210, the AMF 1213 restores the DRX cycle of the UE 1211 to an original value via the UE configuration update procedure.

In operation 1204, the AMF 1213 transmits a UE configuration update command message to the UE 1211. According to an embodiment, the UE configuration update command message may include DRX parameters, an indication of re-registration, and the like. In operation 1204, the AMF 1213 performs the same procedure as operation 803 in the embodiment of FIG. 8.

In operation 1205, the UE 1211 transmits a UE configuration update complete message to the AMF 1213. In operation 1205, the AMF 1213 performs the same procedure as operation 804 in the embodiment of FIG. 8.

In operation 1206, the AMF 1213 transmits a Nudm_SDM_Info service message to the UDM 1214. In operation 1206, the AMF 1213 performs the same procedure as operation 805 in the embodiment of FIG. 8.

In operation 1207, the AMF 1213 transmits a RAN update (update RAN) message to the (R)AN 1212. In operation 1207, the AMF 1213 performs the same procedure as operation 806 in the embodiment of FIG. 8.

In operation 1208, the UE 1211 decides to re-configure a DRX parameter. In operation 1208, the AMF 1213 performs the same procedure as operation 807 in the embodiment of FIG. 8.

In operation 1209, the UE 1211 transmits a registration request message to the AMF 1213. According to an embodiment, the registration request message includes DRX parameters. In operation 1209, the AMF 1213 performs the same procedure as operation 808 in the embodiment of FIG. 8.

In operation 1210, the AMF 1213 transmits a registration accept message to the UE 1211. According to an embodiment, the registration accept message includes an accepted DRX parameter. In operation 1210, the AMF 1213 performs the same procedure as operation 809 in the embodiment of FIG. 8.

Embodiment 6

Figure 13:
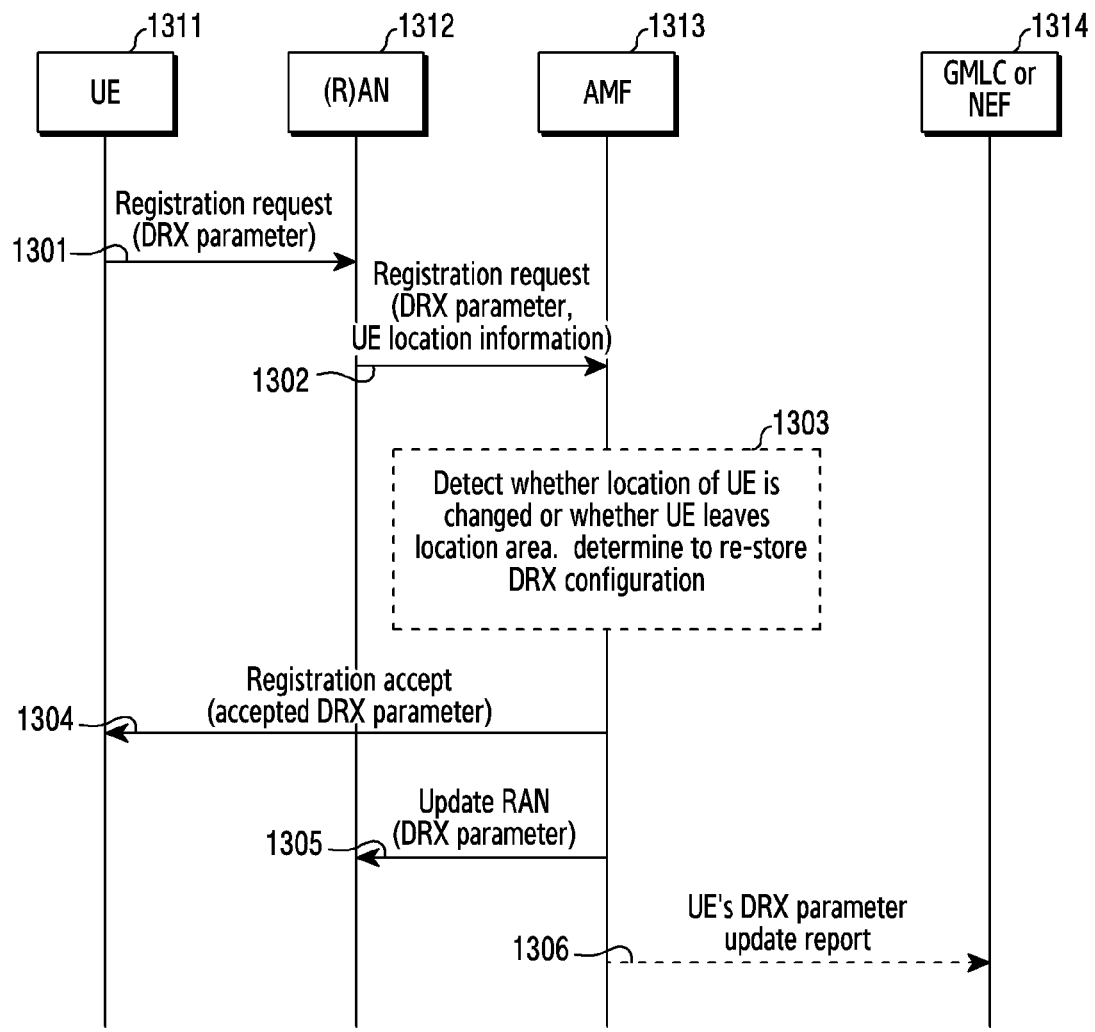
FIG. 13 is a diagram illustrating a process in which an AMF updates a DRX parameter according to movement of a UE in a wireless communication system according to various embodiments of the disclosure.

FIG. 13 is a diagram illustrating a process in which an AMF updates a DRX parameter according to movement of a UE in a wireless communication system according to various embodiments of the disclosure.

In the embodiment of FIG. 13, a registration request message that the UE 1311 transmits triggers the AMF 1313 to update a DRX parameter.

The AMF 1313 receives a registration request message from the UE 1311, and detects that the location of the UE is changed. When the AMF 1313 determines that the UE 1311 is currently in the state in which a DRX parameter for a low-latency location service is adjusted and the current location of the UE is in a location that does not require low-latency requirement, the AMF 1313 determines restoration of the DRX parameter.

When the AMF 1313 determines that the UE 1311 is currently in the state in which a DRX parameter for a low-latency location service is adjusted and the current location of the UE is in a location that does not require low-latency requirement, and a response of a low-latency location service is not present that is performed periodically, delayed, pending, or triggered by a change of the location of the UE, the AMF 1313 determines the restoration of the DRX parameter. The AMF 1313 that determines restoration of the DRX parameter determines to update a UE configuration (UE configuration update) or determines to change a DRX parameter configuration in the RAN 1312 and performs the same.

In operation 1301, the UE 1311 transmits a registration request message to the (R)AN 1312. According to an embodiment, the registration request message of operation 1301 includes a DRX parameter. The UE 1311 transfers the registration request message to the RAN 1312. In order to request updating a DRX parameter, the registration request message may include the value of a DRX parameter with which a DRX parameter desires to be updated.

In operation 1302, the (R)AN 1312 transmits a registration request message to the AMF 1313. According to an embodiment, the registration request message of operation 1302 includes a DRX parameter and UE location information (UE location). The NR-RAN 1312 transfers, to the AMF 1313, the registration request message together with the UE location information, for example, a cell ID, an NG-RAN node ID, or a tracking area.

In operation 1303, the AMF 1313 detects whether the location of the UE 1311 is changed or whether the UE 1311 leaves a location area (detect UE location is changed and UE moved out of location area), and determines to re-store a DRX configuration (decide to re-store the DRX configuration). When receiving a UE registration message, the AMF 1313 detects that the location of the UE 1311 is changed. The AMF 1313 determines whether the UE leaves a location area requested by the location request, or a pending location request is present. The AMF 1313 determines whether it is a shorted DRX cycle mode. The AMF 1313 determines whether to restore a DRX cycle.

In operation 1304, the AMF 1313 transmits a registration accept message to the UE 1311. According to an embodiment, the registration accept message includes an accepted DRX parameter. In the case in which the AMF 1313 determines to restore a DRX cycle to an original value, the AMF 1313 sets a DRX parameter to be restored in the accepted DRX cycle, and transmits a registration response message to the UE 1311.

In operation 1305, the AMF 1313 transmits a RAN update (update RAN) message to the (R)AN 1312. According to an embodiment, the RAN update message includes a DRX parameter. In the case in which the AMF 1313 determines restoration or change of a DRX parameter, the AMF 1313 transmits, to the RAN 1312, a message that requests restoration of the value of a DRX parameter.

In operation 1306, the AMF 1313 transmits a UE's DRX parameter update report message to a GMLC or the NEF 1314.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

INDUSTRIAL APPLICABILITY

The disclosure generally relates to a wireless communication system, and more particularly, to a method and an apparatus for providing a low-latency location information service in a wireless communication system.

The invention claimed is:

1. A method performed by an access and mobility function (AMF) in a wireless communication system, the method comprising:

receiving, from a user equipment (UE), a UE-originated location information request message including first location quality of service (QOS) information;

receiving, from a gateway mobile location center (GMLC) or a network exposure function (NEF), a UE-terminated location information request message including second location QoS information;

determining updating of a UE configuration based on the first location QoS information and second location QoS information;

transmitting, to the UE, a UE configuration update command message; and transmitting, to a base station related to the UE, a radio access network (RAN) update message, in response to reception of a UE configuration update complete message.

2. The method of claim 1, wherein the UE configuration update command message comprises at least one of discontinuous reception (DRX) parameters and an indication of re-registration.

3. The method of claim 2, wherein the DRX parameters are determined based on a DRX cycle length required for providing a low-latency location information service to the UE.

4. The method of claim 2, wherein the indication of re-registration indicates, to the UE, re-performing of a registration procedure in a connected state in order to change a UE specific DRX cycle for the UE.

5. The method of claim 2, wherein the UE configuration update command message further comprises at least one of a setting change indicator, a 5G-globally unique temporary identifier (5G-GUTI), a tracking area identity (TAI) list, allowed network slice selection assistance information (NS-SAI), allowed NSSAI mapping information, a rejected S-NSSAI list, mobility restriction information, local access data network (LADN) information, mobile initiated connection only (MICO), and access classification definition information defined by an operator.

6. The method of claim 1, wherein the first location QoS information and the second location QoS information comprise at least one of location precision, a service level, and a response time.

7. The method of claim 1, wherein the updating of the UE configuration is determined further based on a 5G enhanced positioning area.

8. An apparatus of an access and mobility function (AMF) in a wireless communication system, the apparatus comprising:

a transceiver; and at least one processor, wherein the at least one processor is configured to:

receive, from a user equipment (UE), a UE-originated location information request message including first location quality of service (QOS) information, receive, from a gateway mobile location center (GMLC) or a network exposure function (NEF), a UE-terminated location information request message including second location QoS information, determine updating of a UE configuration based on the first location QoS information and the second location QoS information, transmit, to the UE, a UE configuration update command message, and transmit, to a base station related to the UE, a radio access network (RAN) update message in response to reception of a UE configuration update complete message.

9. The apparatus of claim 8, wherein the UE configuration update command message comprises at least one of DRX parameters and an indication of re-registration.

10. The apparatus of claim 9, wherein the DRX parameters are determined based on a DRX cycle length required for providing a low-latency location information service to the UE.

11. The apparatus of claim 9, wherein the indication of re-registration indicates, to the UE, re-performing of a registration procedure in a connected state in order to change a UE specific DRX cycle for the UE.

12. The apparatus of claim 9, wherein the UE configuration update command message further comprises at least one of a setting change indicator, a 5G-globally unique temporary identifier (5G-GUTI), a tracking area identity (TAI) list, allowed network slice selection assistance information (NSSAI), allowed NSSAI mapping information, a rejected S-NSSAI list, mobility restriction information, local access data network (LADN) information, mobile initiated connection only (MICO), and access classification definition information defined by an operator.

13. The apparatus of claim 8, wherein the first location QoS information and the second location QoS information comprise at least one of location precision, a service level, and a response time.

14. The apparatus of claim 8, wherein the updating of the UE configuration is determined further based on a 5G enhanced positioning area.

15. A method performed by a user equipment (UE) in a wireless communication system, the method comprising:
    transmitting, to an access and mobility function (AMF), a UE-originated location information request message including first location quality of service (QoS) information;
    receiving, from the AMF, a UE configuration update command message; and
    transmitting, to the AMF, a UE configuration update complete message,
    wherein the UE configuration update command message is determined based on the first location QoS information and a second QoS information, and
    wherein the second QoS information is included in a UE-terminated location information request message transmitted from a gateway mobile location center (GMLC) or a network exposure function (NEF).

16. The method of claim 15, wherein the UE configuration update command message comprises at least one of discontinuous reception (DRX) parameters and an indication of re-registration.

17. The method of claim 16, wherein the DRX parameters are determined based on a DRX cycle length required for providing a low-latency location information service to the UE.

18. The method of claim 16, wherein the indication of re-registration indicates, to the UE, re-performing of a registration procedure in a connected state in order to change a UE specific DRX cycle for the UE.

19. The method of claim 16, wherein the UE configuration update command message further comprises at least one of a setting change indicator, a 5G-globally unique temporary identifier (5G-GUTI), a tracking area identity (TAI) list, allowed network slice selection assistance information (NSSAI), allowed NSSAI mapping information, a rejected S-NSSAI list, mobility restriction information, local access data network (LADN) information, mobile initiated connection only (MICO), and access classification definition information defined by an operator.

20. The method of claim 15, wherein the first location QoS information and the second location QoS information comprise at least one of location precision, a service level, and a response time.

* * * * *